(12) United States Patent
Goto et al.

(10) Patent No.: US 7,104,596 B2
(45) Date of Patent: Sep. 12, 2006

(54) VEHICLE BODY STRUCTURE

(75) Inventors: Takeshi Goto, Wako (JP); Shigeto Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 10/963,491

(22) Filed: Oct. 12, 2004

(65) Prior Publication Data

US 2005/0082879 A1    Apr. 21, 2005

(30) Foreign Application Priority Data

Oct. 16, 2003  (JP)  ............................. 2003-356966
Oct. 16, 2003  (JP)  ............................. 2003-357040

(51) Int. Cl.
   *B60R 27/00*    (2006.01)
(52) U.S. Cl. ........................... 296/193.07; 296/187.08; 296/204
(58) Field of Classification Search ........... 296/193.07, 296/193.09, 204, 205, 203.02, 187.01, 187.03, 296/187.08, 187.09, 187.12, 193.01, 209, 296/203.03
   See application file for complete search history.

(56) References Cited

U.S. PATENT DOCUMENTS 5,549,349 A * 8/1996 Corporon et al. ...... 296/187.12
6,540,286 B1 * 4/2003 Takemoto et al. .......... 296/204
6,793,276 B1 * 9/2004 Sugihara et al. ............ 296/204
2001/0028179 A1 * 10/2001 Takemoto et al. .......... 296/204
2003/0034673 A1 * 2/2003 Sugihara et al. ............ 296/204

FOREIGN PATENT DOCUMENTS

| JP | 61-85579 | 6/1986 |
| JP | 9-66864 | 3/1997 |
| JP | 11-78992 | 3/1999 |
| JP | 2000-108949 | 4/2000 |

* cited by examiner

*Primary Examiner*—Lori L. Coletta
(74) *Attorney, Agent, or Firm*—Rankin, Hill, Porter & Clark LLP

(57) ABSTRACT

A vehicle body structure for efficiently transmitting and dispersing collision energy is provided. The vehicle body structure includes a floor tunnel provided in the center of the vehicle width and extending longitudinally of a vehicle body. Side portions of the floor tunnel are joined to floor frame members provided on the right and left thereof. A rear portion of the floor tunnel is joined to center frame members provided rearward thereof. Collision energy acting on the front end of the floor tunnel is transmitted and dispersed to the right and left floor frame members and the center frame members. Collision energy acting on the floor frame members is transmitted and dispersed to the floor tunnel and the center frame members. Collision energy transmitted to the center frame members is transmitted and dispersed through a plurality of crossmembers disposed rearward of the floor tunnel to the rear of the vehicle body.

17 Claims, 20 Drawing Sheets

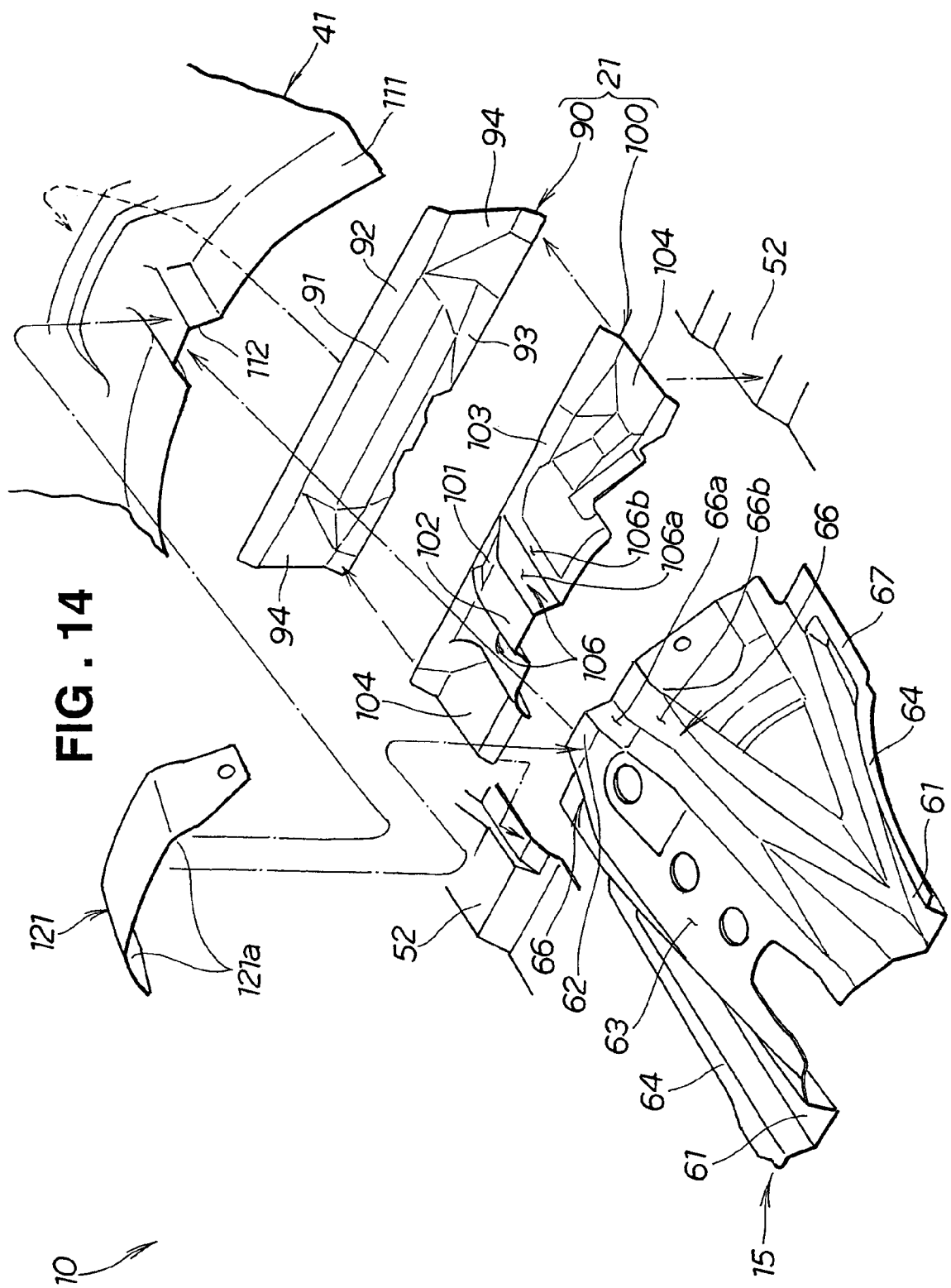

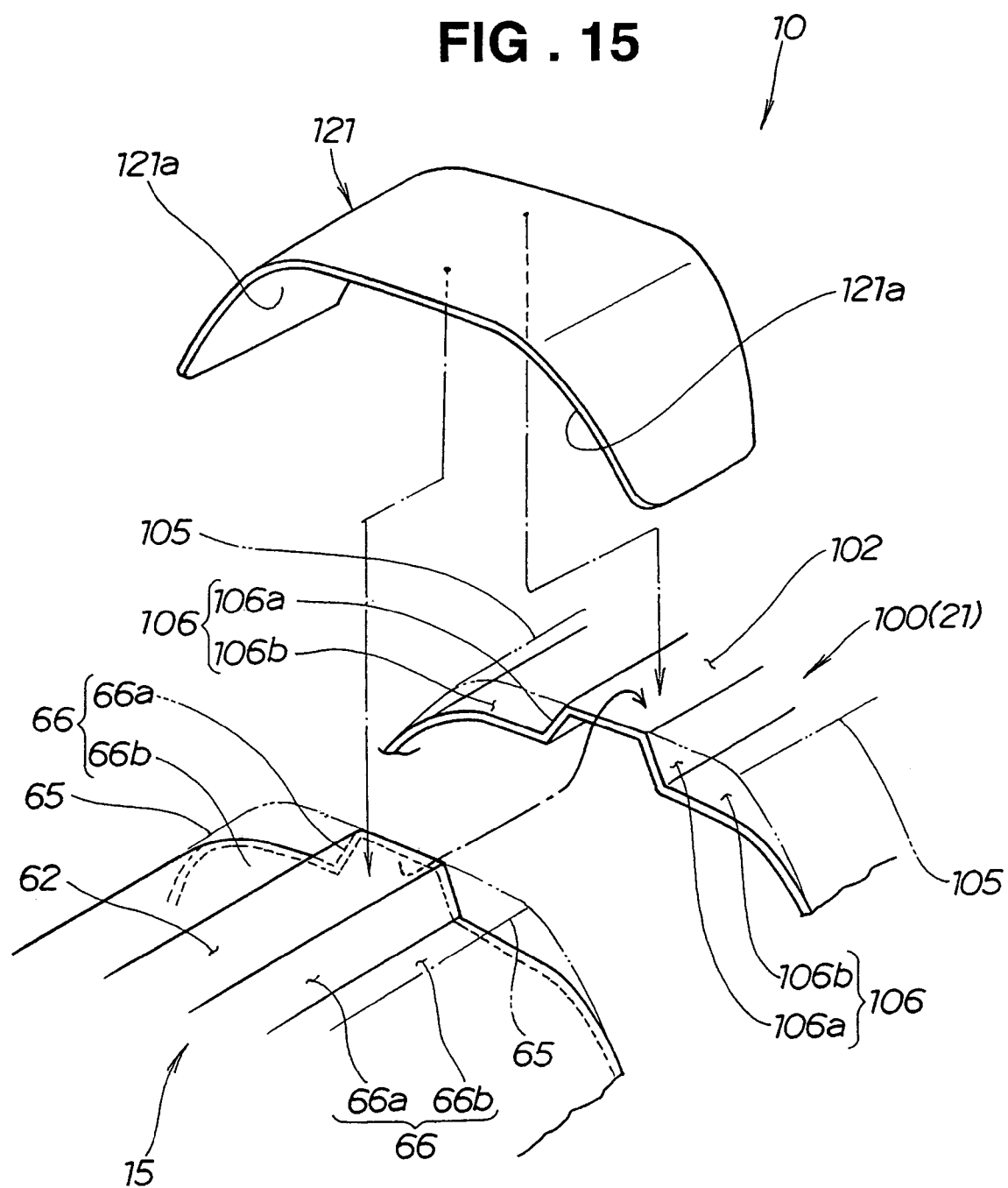

(EMBODIMENT)

(EMBODIMENT)

(COMP. EX.)

(EMBODIMENT)

(COMP. EX.)

(EMBODIMENT)

(EMBODIMENT)

(COMP. EX.)

VEHICLE BODY STRUCTURE

FIELD OF THE INVENTION

The present invention relates to an improvement in a vehicle body structure in which a floor tunnel is provided in the center of the vehicle width.

BACKGROUND OF THE INVENTION

A vehicle body structure of this type is disclosed in Japanese Patent Laid-Open Publication No. 2000-108949, for example. This vehicle body structure will be described with reference to FIG. 19 hereof.

A vehicle body 200 shown in FIG. 19 includes a floor tunnel 201 extending longitudinally in the center of the vehicle width, right and left side sills 202 (only one is shown.) provided on the opposite sides of the vehicle body and extending longitudinally, and right and left floor panel portions 203, 203 interposed between the floor tunnel 201 and the side sills 202.

A propeller shaft 211 is extended through the inside of the floor tunnel 201. The propeller shaft 211 is mounted to the inside of the floor tunnel 201 with reinforcing members 212, 212 and a bracket 213.

A crossmember 214 is extended across the floor tunnel 201 between the right and left side sills 202. Right and left brackets 215, 215 for mounting a sheet (not shown) are provided on the right and left floor panel portions 203, 203, respectively. Reference numeral 216 denotes a handbrake device.

In some types of vehicles, an engine is mounted to the front of a vehicle body via a subframe, and a propeller shaft is not extended through a floor tunnel. In such types of vehicles, however, various types of equipment such as a muffler is sometimes disposed below a front half portion of a floor tunnel. Therefore, a floor tunnel protruding upward for various types of equipment cannot be completely eliminated. It is, however, possible to reduce the height of a rear half portion of the floor tunnel. The reduced height of the rear half portion of the floor tunnel results in a larger passenger compartment and improved comfort. It is especially effective for low-floor type vehicles, for which it is desired to reduce the height of a rear half portion of a floor tunnel to make a passenger compartment larger.

When collision energy acts on the front of a vehicle body, plastically deforming the vehicle front, a subframe mounted to the vehicle front and an engine mounted on the subframe are moved rearward. The engine located in a higher level than the subframe strikes a front upper edge of a floor tunnel, producing collision energy acting on the front upper edge. Also, collision energy acts from the retreated low-level subframe on a front lower edge of the floor tunnel. In this manner, collision energy is transmitted from both the retreated high-level engine and low-level subframe to the floor tunnel. It is required to efficiently transmit the collision energy to the front of the vehicle body.

Now, a conventional vehicle body structure in which floor frame members are provided to increase the rigidity of a floor panel and to increase the rigidity of an entire vehicle body will be described with reference to FIGS. 20 and 21.

A vehicle body 300 shown in FIG. 20 includes a floor tunnel 301 provided in the center of the vehicle width and extending longitudinally, right and left floor frame members 302, 302 disposed on the right and left of the floor tunnel 301 and extending longitudinally, and right and left side sills 303, 303 provided outside of the right and left floor frame members 302, 302 and extending longitudinally.

Right and left front side members 304, 304 extend forward from the front ends of the right and left floor frame members 302, 302. A floor panel 305 (see FIG. 21) integrally continuous with the floor tunnel 301 is placed on and joined to the right and left floor frame members 302, 302. Reference numerals 306, 306 denote outriggers.

Collision energy acting on the front of the vehicle body 300 is transmitted and dispersed from the front side members 304, 304 through the floor frame members 302, 302 to the floor panel 305 (see FIG. 21), and is further transmitted from the floor panel 305 to the floor tunnel 301. The floor frame members 302, 302 are retreated by the collision energy, causing a force for deforming the floor panel 305 rearward from the floor tunnel 301 of relatively high rigidity.

When the vehicle front is plastically deformed by collision energy acting on the front of the vehicle body 300, a subframe 308 mounted to the front of the vehicle body 300 and an engine 307 mounted on the subframe 308 are moved rearward. As a result, the subframe 308 and the engine 307 strike the front end of the floor tunnel 301, applying the collision energy to the front end of the floor tunnel 301. The collision energy is transmitted and dispersed from the floor tunnel 301 to the floor panel 305, and is further transmitted from the floor panel 305 to the floor frame members 302, 302.

It is difficult to configure the floor tunnel 301 and the floor frame members 302, 302 so that the amount of plastic deformation of the floor tunnel 301 is equal to the amount of retreat and the amount of plastic deformation of the floor frame members 302, 302 when collision energy acts on the floor tunnel 301 as described above. Therefore, the floor panel 305 can deform between the floor tunnel 301 and the floor frame members 302, 302. Large deformation of the floor panel 305 (e.g., development of large creases) affects the joined state of the floor panel 305 to the floor tunnel 301 and the floor frame members 302, 302.

In order to avoid such influence, it may be conceived to reinforce low-rigidity portions with reinforcing members. However, it unfavorably complicates the configuration of the vehicle body 300 and also increases the vehicle weight.

In this context, it is desired to prevent difference in displacement between a floor tunnel and floor frame members even when the front of a vehicle body receives collision energy, avoiding increase in the weight of the vehicle body with a simple configuration.

SUMMARY OF THE INVENTION

According to the present invention, there is provided a vehicle body structure, which comprises: a floor tunnel provided in a center of a width of a vehicle body and extending longitudinally of the vehicle body; right and left floor frame members provided right and left of the floor tunnel; and center frame members provided rearward of the floor tunnel; wherein, the floor tunnel includes at least one of, right and left side portions joined to at least one of the right and left floor frame members, and a rear portion joined to the center frame members.

With this vehicle body structure, even when an engine and a subframe for mounting the engine are moved rearward by collision energy acting on the front of the vehicle, causing the collision energy to act on the front end of the floor tunnel, the collision energy can be efficiently dispersed through the floor tunnel into the right and left floor frame members and the center frame members. The collision energy is further transmitted and dispersed to a plurality of crossmembers, for example, located rearward of the center frame members and joined to the center frame members.

Also, in the case where the engine and another component are not moved rearward, collision energy is transmitted and dispersed from the floor frame members to the floor tunnel, and is transmitted and dispersed efficiently to the center frame members and the crossmembers.

The vehicle body structure of this invention preferably further comprises crossmembers extended between right and left side sills which are provided outside of the right and left floor frame members and extend longitudinally of the vehicle body. A top surface of the floor tunnel is sloped rearward and downward from a front end portion thereof. A rear end portion of the floor tunnel is joined to the crossmembers.

With the top surface of the floor tunnel sloped rearward and downward from the front end portion, when collision energy acts on a front upper edge of the floor tunnel, the collision energy is efficiently transmitted rearward and downward of the floor tunnel along the downslope, and is further efficiently dispersed through the rearward crossmembers to the vehicle rear.

When collision energy acts on a front lower edge of the floor tunnel, the collision energy is directly transmitted to the rear of the floor tunnel.

There is no need to provide a member for efficiently transmitting collision energy from the floor tunnel to the vehicle rear, and thus the vehicle weight can be reduced.

When collision energy acts on the front of the vehicle body, plastically deforming the front of the vehicle body, for example, a subframe mounted to the front of the vehicle body and an engine mounted on the subframe are generally moved rearward. As a result, the engine located in a higher level than the subframe strikes the front upper edge of the floor tunnel, and the collision energy acts on the front upper edge. Also, the collision energy acts from the retreated low-level subframe on the front lower edge of the floor tunnel. Thus, the collision energy is transmitted from both the retreated high-level engine and low-level subframe to the floor tunnel.

In such a case, the vehicle body structure of this invention can efficiently transmit collision energy acting on the front upper edge, rearward and downward of the floor tunnel, and transmit the collision energy acting on the front lower edge, directly to the rear of the floor tunnel, and further efficiently transmit it through the crossmembers located rearward to the vehicle rear.

In the vehicle body structure of this invention, a front portion of at least one of the right and left side portions of the floor tunnel is preferably directly connected to a front side portion of at least one of the right and left floor frame members.

By directly joining the front side portion of the floor frame member to the front side portion of the floor tunnel as described above, the floor tunnel and the floor frame member can disperse a longitudinal load therebetween into one another, and also can complement one another in strength and rigidity.

When collision energy acts on the front of the vehicle body, the collision energy acting on the floor tunnel is directly transmitted and dispersed from the floor tunnel to the floor frame member. Also, collision energy acting on the floor frame member is directly transmitted and dispersed from the floor frame member to the floor tunnel. Longitudinal displacement between the floor tunnel and the floor frame member can thus be prevented. As a result, deformation of a floor panel between the floor tunnel and the floor frame member can be prevented, and the joined state of the floor panel is ensured.

Only directly joining the front side portion of the floor tunnel and the front side portion of the floor frame member eliminates the need for providing an additional joining member, resulting in a simple vehicle body configuration and a reduced vehicle weight.

In the vehicle body structure of this invention, preferably, the front portion of the right or left side portion of the floor tunnel includes a substantially horizontal tunnel side extension extending toward the floor frame member, the floor frame member includes a substantially horizontal frame side extension extending toward the floor tunnel, and the tunnel side extension is overlapped with and joined to the frame side extension.

That is, the floor tunnel and the floor frame member can be directly joined together. Since the floor tunnel and the floor frame member are frame members of the vehicle body, the plate thickness thereof is greater than that of the mere floor panel. It is a very simple structure of just overlapping and joining the plate members, utilizing the large thickness, and the joining can be easily done.

BRIEF DESCRIPTION OF THE DRAWINGS

Preferred embodiments of the present invention will be described in detail below, by way of example only, with reference to the accompanying drawings, in which:

FIG. 14 is an exploded view of the floor tunnel, the first crossmember and the dashboard;

FIG. 15 is an exploded view of the floor tunnel and the first cross-member;

DETAILED DESCRIPTION OF THE PREFERRED EMBODIMENTS

Figure 1:
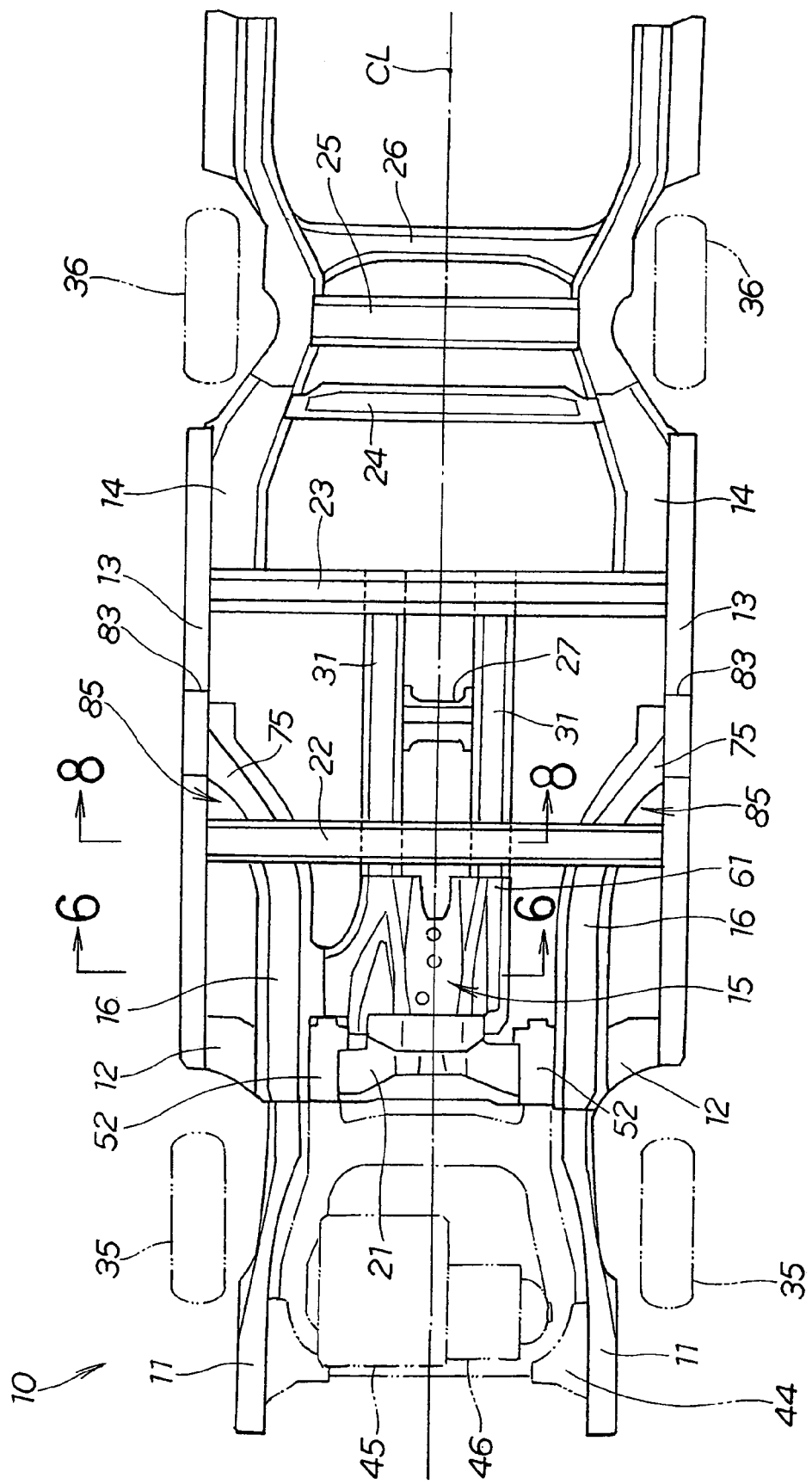
FIG. 1 is a plan view of a vehicle body according to the present invention, with a floor panel removed, a floor tunnel left.

FIG. 1 shows a vehicle body 10 with a floor panel removed, but a floor tunnel 15 is shown for convenience of description. Throughout the drawings the terms "front," "rear," "right" and "left" represent directions as viewed from a driver.

Referring to FIG. 1, the vehicle body 10 is a low-floor vehicle body with a floor panel reduced in height. The vehicle body 10 is comprised of a vehicle frame mainly including front side members 11, 11, right and left side outriggers 12, 12, right and left side sills 13, 13, right and left rear side members 14, 14, a floor tunnel 15, floor frame members 16, 16, and crossmembers 21–26.

The right and left front side members 11, 11 are disposed at the front of the vehicle body 10, extending longitudinally of the vehicle body 10.

The right and left side outriggers 12, 12 are joined to rear side portions of the right and left front side members 11, 11.

The right and left side sills 13, 13 extend rearward from rear portions of the right and left side outriggers 12, 12.

The right and left rear side members 14, 14 extend rearward from rear portions of the right and left side sills 13, 13.

The floor tunnel 15 is disposed on the longitudinal center line CL, extending longitudinally of the vehicle body 10.

The floor frame members 16, 16 are disposed on the opposite sides of the floor tunnel 15, extending longitudinally of the vehicle body 10.

The six crossmembers 21, 22, 23, 24, 25 and 26 aligned longitudinally of the vehicle body 10 extend in a vehicle transverse direction. The six cross-members 21 to 26 are aligned from the front of the vehicle body 10 to the rear in the order of the first crossmember 21, second crossmember 22, third cross-member 23, fourth crossmember 24, fifth crossmember 25 and sixth cross-member 26.

The first crossmember 21 will be described in detail below. The second and third crossmembers 22, 23 are disposed rearward of the floor tunnel 15 and extended between the right and left side sills 13, 13. The fourth, fifth and sixth crossmembers 24, 25 and 26 are extended between the right and left rear side members 14, 14.

In a common vehicle, the floor tunnel 15 extends to the third crossmember 23. In the present invention, which adopts a front-engine front-drive system (FF system) as a power transmission system of the vehicle, it is not necessary to extend a propeller shaft through the floor tunnel 15. However, it is necessary to dispose various types of equipment in the vicinity of a front half portion of the floor tunnel 15, preventing complete elimination of the floor tunnel 15.

A rear half portion of the floor tunnel 15 can be reduced in height to provide a large passenger compartment and improve comfort.

For this reason, in the present invention, the floor tunnel 15 is shortened to the extent of extending to the front of the second crossmember 22. Right and left center frame members 31, 31 extend rearward from the rear of the floor tunnel 15. The center frame members 31, 31 are located lower than the floor tunnel 15.

More specifically, a rear end portion 61 of the short floor tunnel 15 is joined to the second crossmember 22 and the third crossmember 23 via the pair of right and left center frame members 31, 31. The center frame members 31, 31 are aligned on the opposite sides of the longitudinal center line CL, extending longitudinally. A seventh crossmember 27 is extended between the right and left center frame members 31, 31. The rear end portion 61 of the floor tunnel 15 may alternatively be joined to the second crossmember 22 directly.

The right and left front side members 11, 11 extend forward from the front ends of the right and left floor frame members 16, 16.

The right and left floor frame members 16, 16 are disposed on the right and left of the longitudinal center line CL, respectively. The right and left side sills 13, 13 are disposed outside of the right and left floor frame members 16, 16, respectively.

Reference numerals 35, 35 denote right and left front wheels, and reference numerals 36, 36 denote right and left rear wheels.

Figure 2:
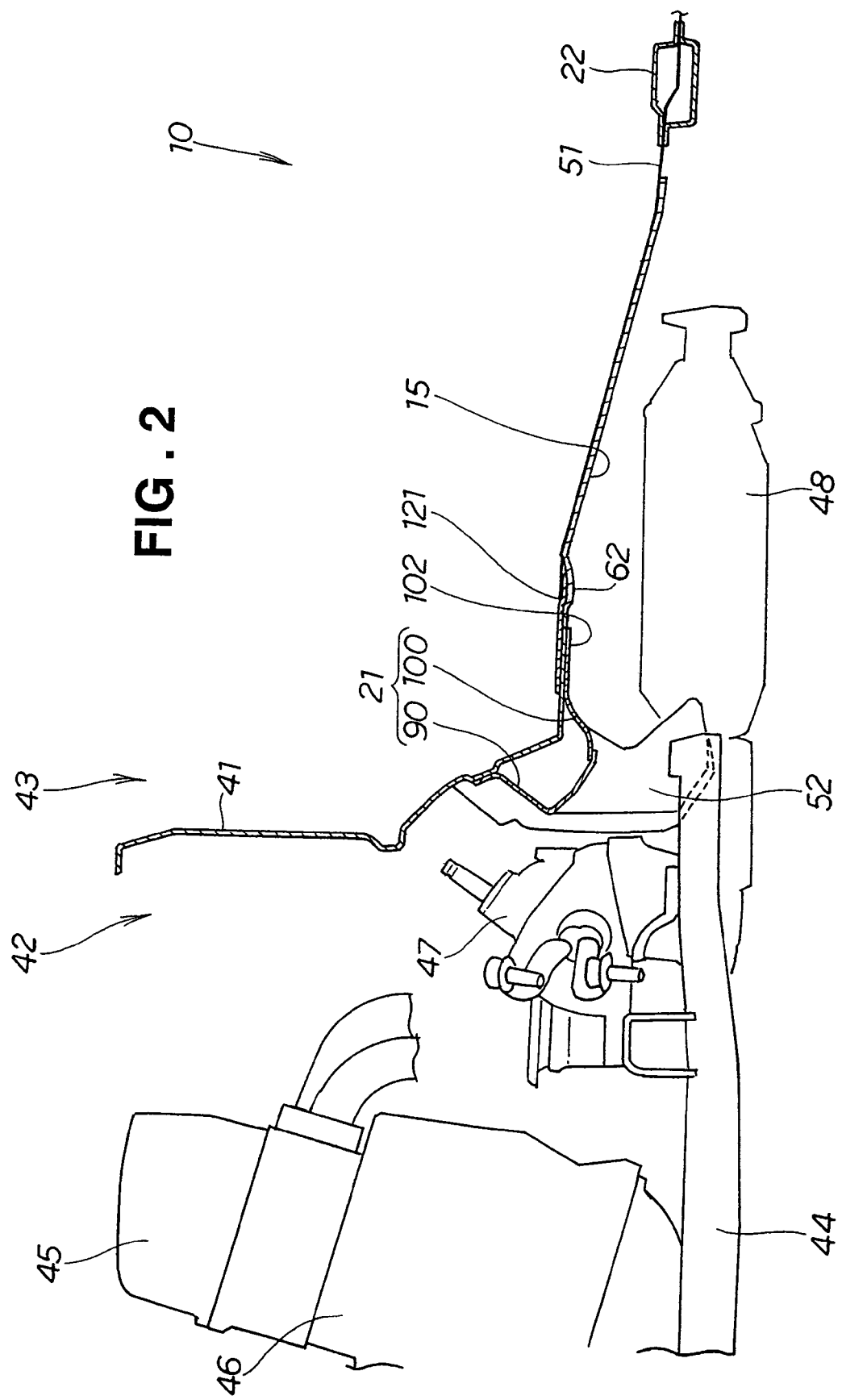
FIG. 2 is a cutaway view illustrating the configuration around a dashboard according to the present invention.

FIG. 2 shows components arranged in front of the floor tunnel 15.

As shown in FIG. 2, the vehicle body 10 is partitioned into an engine compartment 42 and a passenger compartment 43 by a dashboard 41. In the engine compartment 42, an engine-mounting subframe 44 is removably attached to the right and left front side members 11, 11 (see FIG. 1) extending longitudinally. On the engine-mounting subframe 44 are mounted an engine 45, a transmission 46 and a steering device 47. The first crossmember 21 is disposed at the bottom of the dashboard 41. Reference numeral 48 denotes an engine exhaust muffler.

Figure 3:
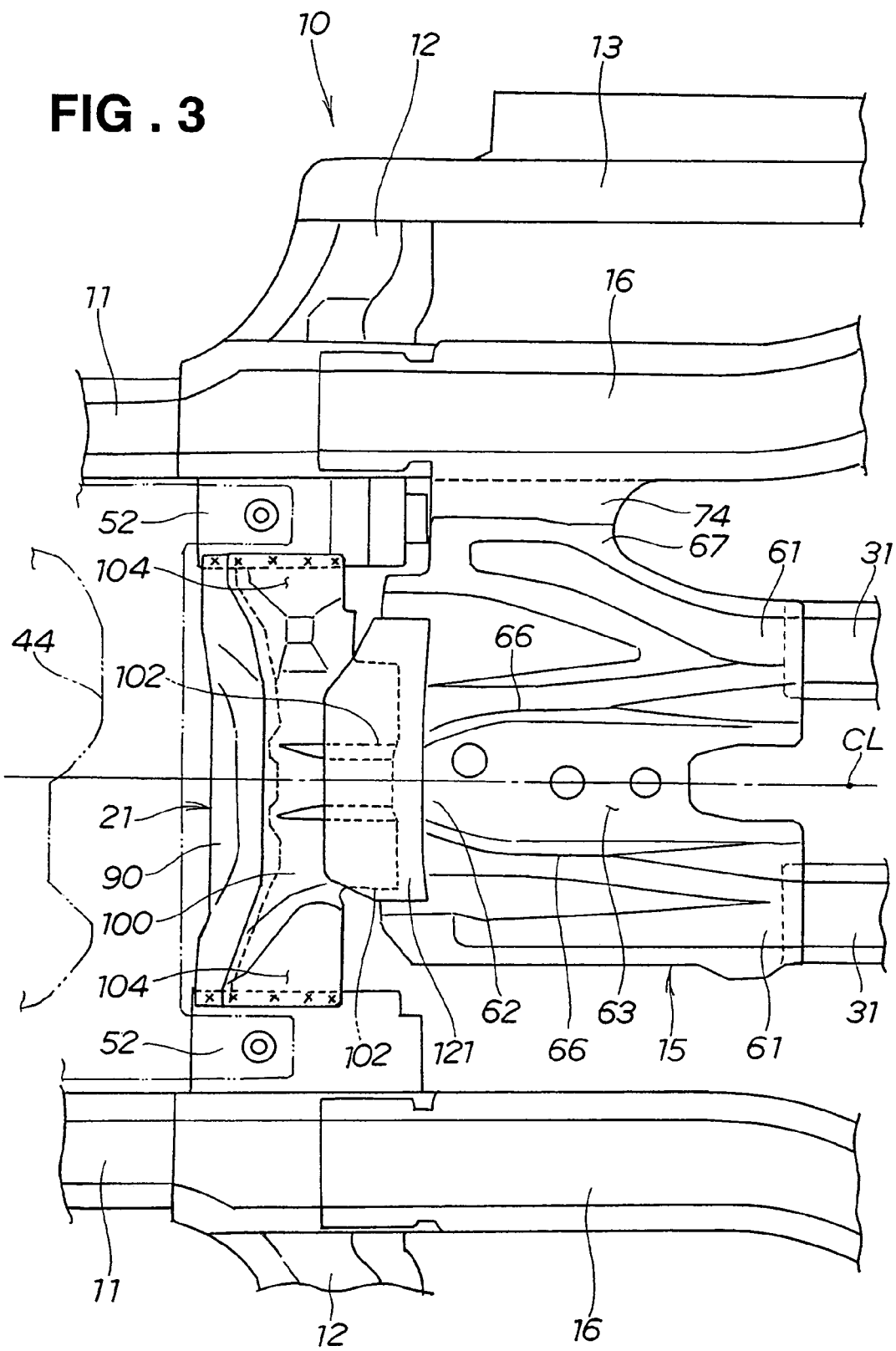
FIG. 3 is a plan view of the vehicle body, showing the floor tunnel and surrounding parts.

Referring to FIG. 3, the right and left front side members 11, 11 are provided with right and left brackets 52, 52, respectively, at the inner surfaces of their respective rear end portions. To the brackets 52, 52 are removably attached rear end portions of the engine-mounting subframe 44 shown in imaginary lines, so that the engine-mounting subframe 44 is attached to the front side members 11, 11.

Figure 4:
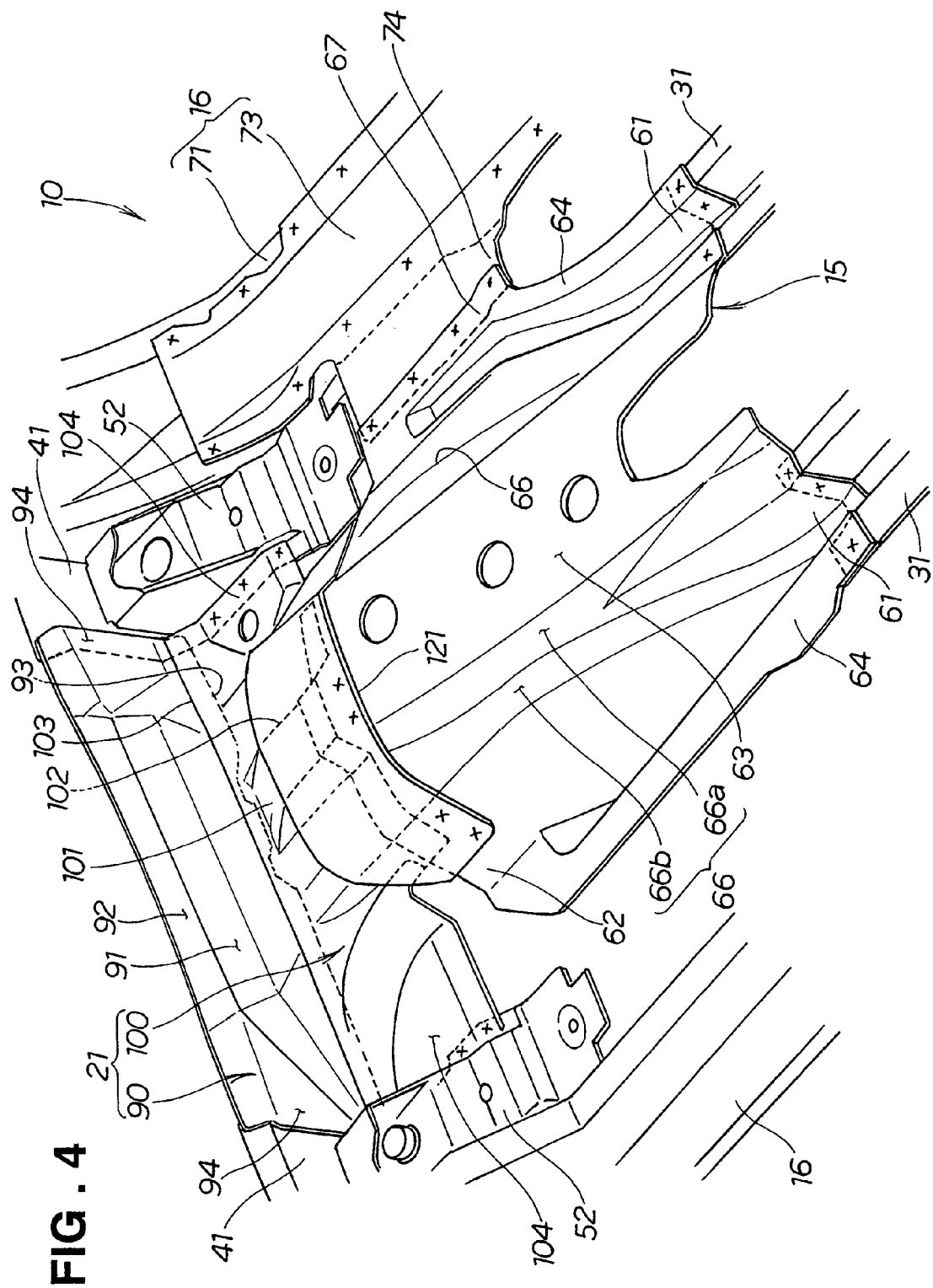
FIG. 4 is a perspective view of the floor tunnel and the surrounding parts shown in FIG. 3.
Figure 5:
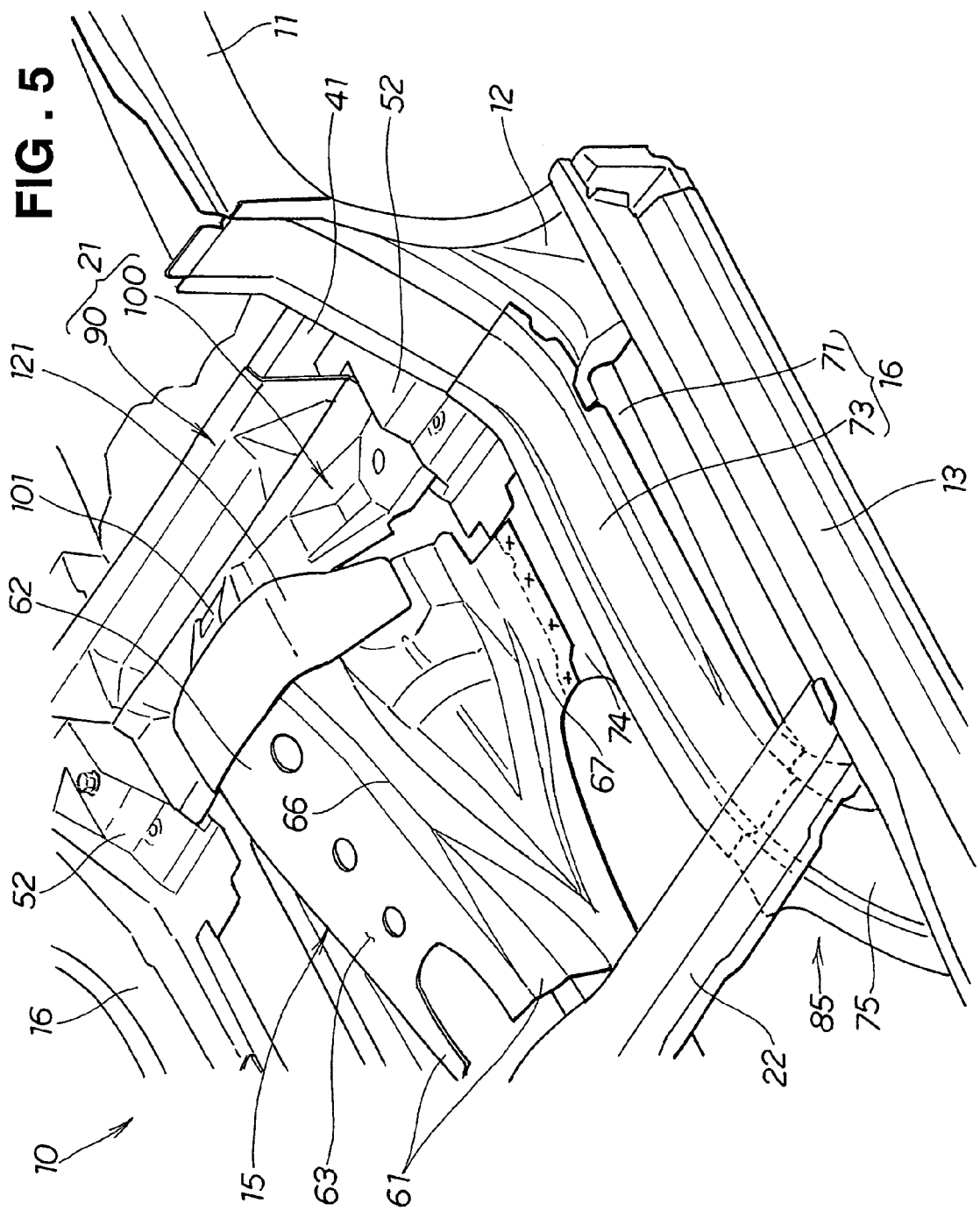
FIG. 5 is a perspective view of the floor tunnel and the surrounding parts when viewed from the opposite side to that in FIG. 4.

As shown in FIGS. 3–5, the floor tunnel 15 has a streamline shape gradually lowered from a front end portion 62 to the rear. Specifically, the floor tunnel 15 has a substantially rectangular shape in a plan view, including a top wall 63 sloped rearward and downward from the front end portion 62.

Figure 6:
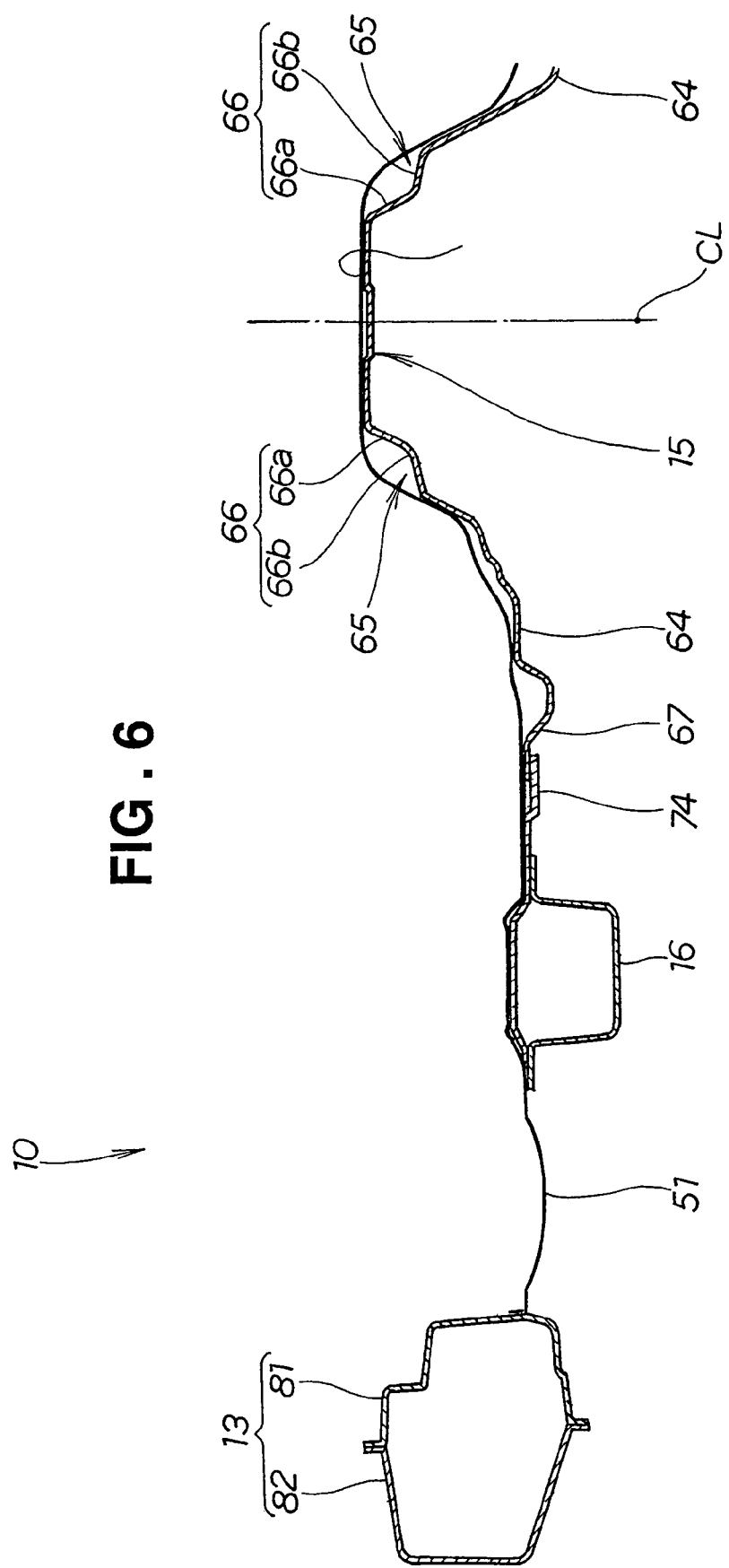
FIG. 6 is a cross-sectional view taken along line 6—6 in FIG. 1.

As shown in FIG. 6, the floor tunnel 15 is a bent part of a plate member and formed in a substantially downward U-shape in a front view. The right and left edges of the floor tunnel 15 constitute horizontal flanges 64, 64 extending toward the opposite right and left side sills 13, 13 (only one is shown), respectively. The plate thickness of the floor tunnel 15 is greater than that of the floor panel 51.

The floor panel 51 is a thin plate placed on and joined to the right and left floor frame members 16, 16 (only one is shown) and the floor tunnel 15, and also joined to the right and left side sills 13, 13 (only one is shown). The floor tunnel 15 is continuous with the floor panel 51. The floor tunnel 15 is in a higher level than the floor surface of the floor panel 51.

As shown in FIGS. 3 to 6, the floor tunnel 15, or the downward U-shaped section body 15 is provided with right and left steps 66, 66 formed by depressing right and left upper corners 65, 65 (see FIG. 6) in a step. Each step 66 consists of a bent-down portion 66a extending downward from the top wall 63 of the floor tunnel 15 and a step surface portion 66b extending laterally from the bottom of the bent-down portion 66a. The right and left steps 66, 66 extend rearward and downward along the top wall 63, so that the step surface portions 66b, 66b also extend rearward and downward, meeting the flanges 64, 64 at their respective rear ends.

As shown in FIGS. 3 and 4, the rear end portion 61 of the floor tunnel 15 is forked right and left. The pair of right and left center frame members 31, 31 are joined at their respective front ends to the fork branches by spot welding or the like. The center frame members 31, 31 are elongated beams in a hat-like shape in a cross-sectional view.

Now, the connection between the right and left floor frame members 16, 16 and the floor tunnel 15 will be described with reference to FIG. 7.

The right floor frame member 16 is a beam of a closed-section structure, configured by placing a substantially flat-plate cover portion 73 on a frame body 71 of a substantially U-shaped section opening upward in a front view, and joining them together by spot welding or the like. The frame body 71 includes flanges 72, 72 extending right and left from the top edges.

The right floor frame member 16, that is, the frame body 71 and the cover portion 73 are bent parts of plate members. The plate thickness of the frame body 71 and the cover portion 73 is greater than that of the floor panel 51.

Figure 7:
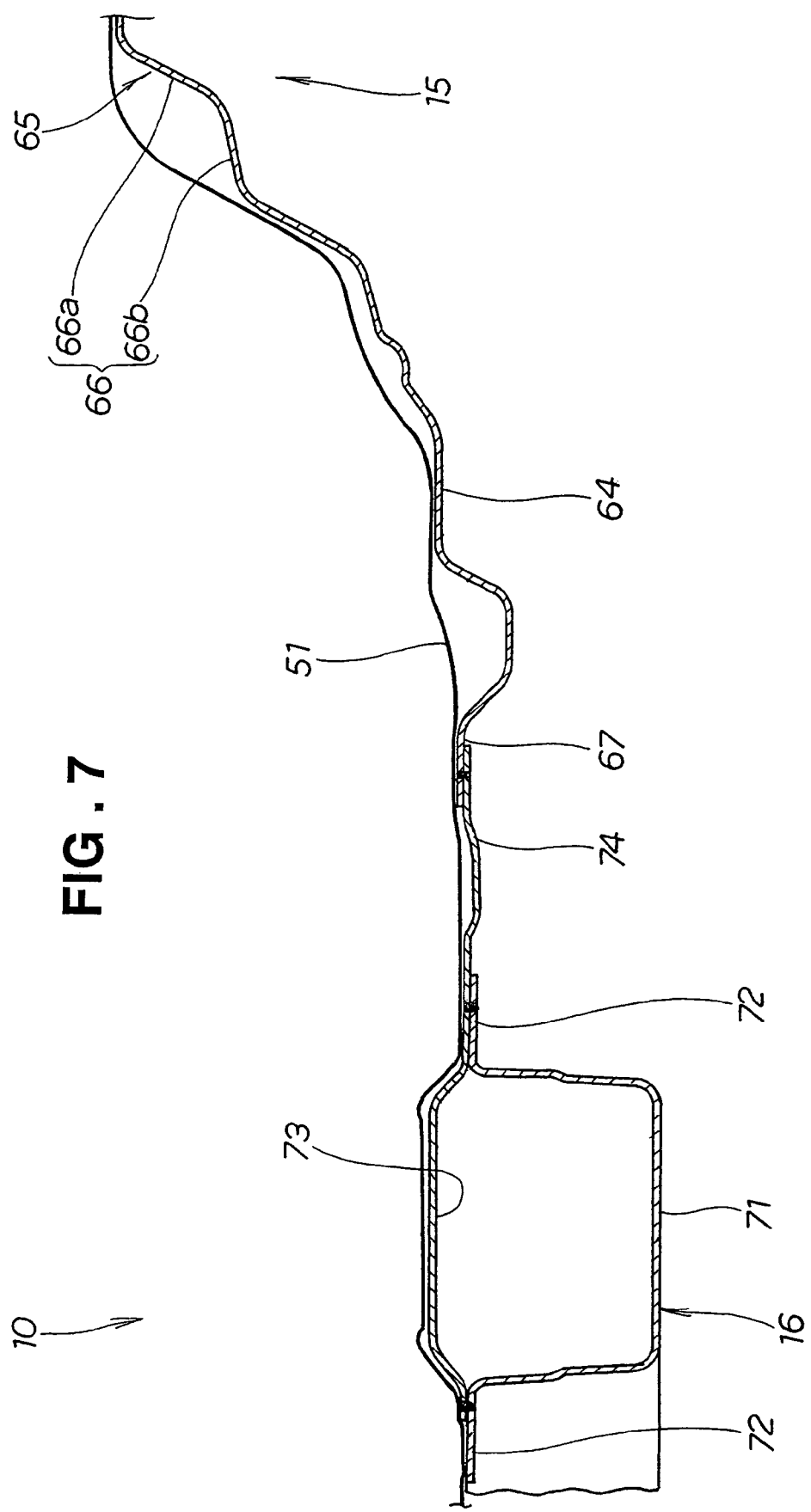
FIG. 7 is an enlarged view of a right floor frame member, the floor tunnel and surrounding parts shown in FIG. 6.

As shown in FIGS. 4, 5 and 7, the floor frame member 16 includes a frame side extension 74 which is a part of a substantially horizontal portion of a plate member constituting part of the floor frame member 16, such as a part of the cover portion 73, extending toward the floor tunnel 15.

The floor tunnel 15 includes a tunnel side extension 67 which is a part of a substantially horizontal portion of a plate member constituting the floor tunnel 15, such as a part of the flange 64, extending toward the floor fame member 16.

The tunnel side extension 67 is overlapped with the frame side extension 74 to join them by spot welding, thereby to join a front side portion of the floor tunnel 15 and a front side portion of the floor frame member 16 together.

The floor tunnel 15 and the floor frame member 16 are frame members of the vehicle body 10. Thus, the plate thickness of the plate members constituting them is greater than that of the floor panel 51. It is a very simple structure of just overlapping and joining the plate members of a large thickness, and the joining can be easily done.

The left floor frame member 16 has the same configuration as that of the right floor frame member 16. It is optional to join the left floor frame member 16 and the floor tunnel 15 in the same manner as the joint structure between the right floor frame member 16 and the floor tunnel 15.

Figure 8:
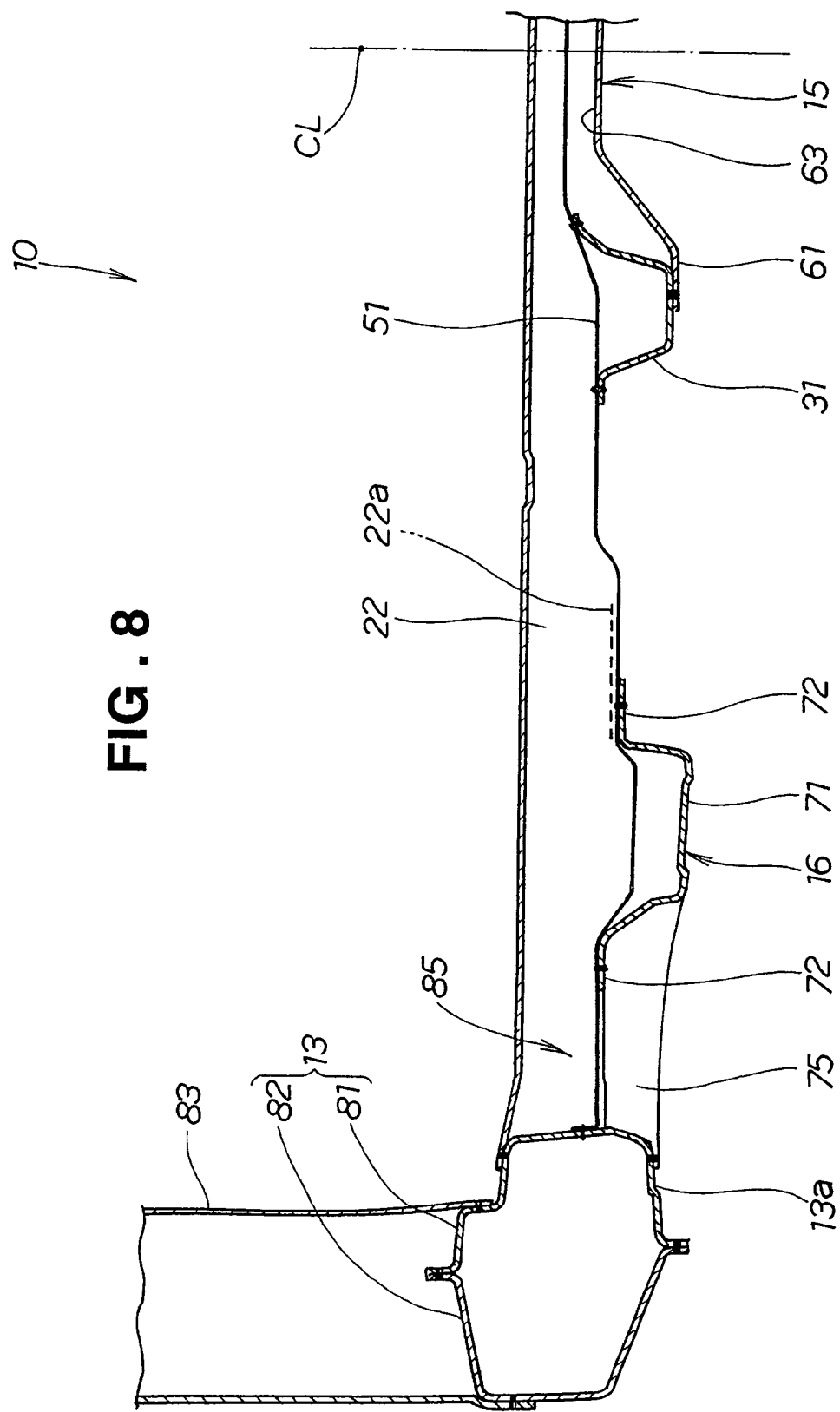
FIG. 8 is a cross-sectional view taken along line 8—8 in FIG. 1.
Figure 9:
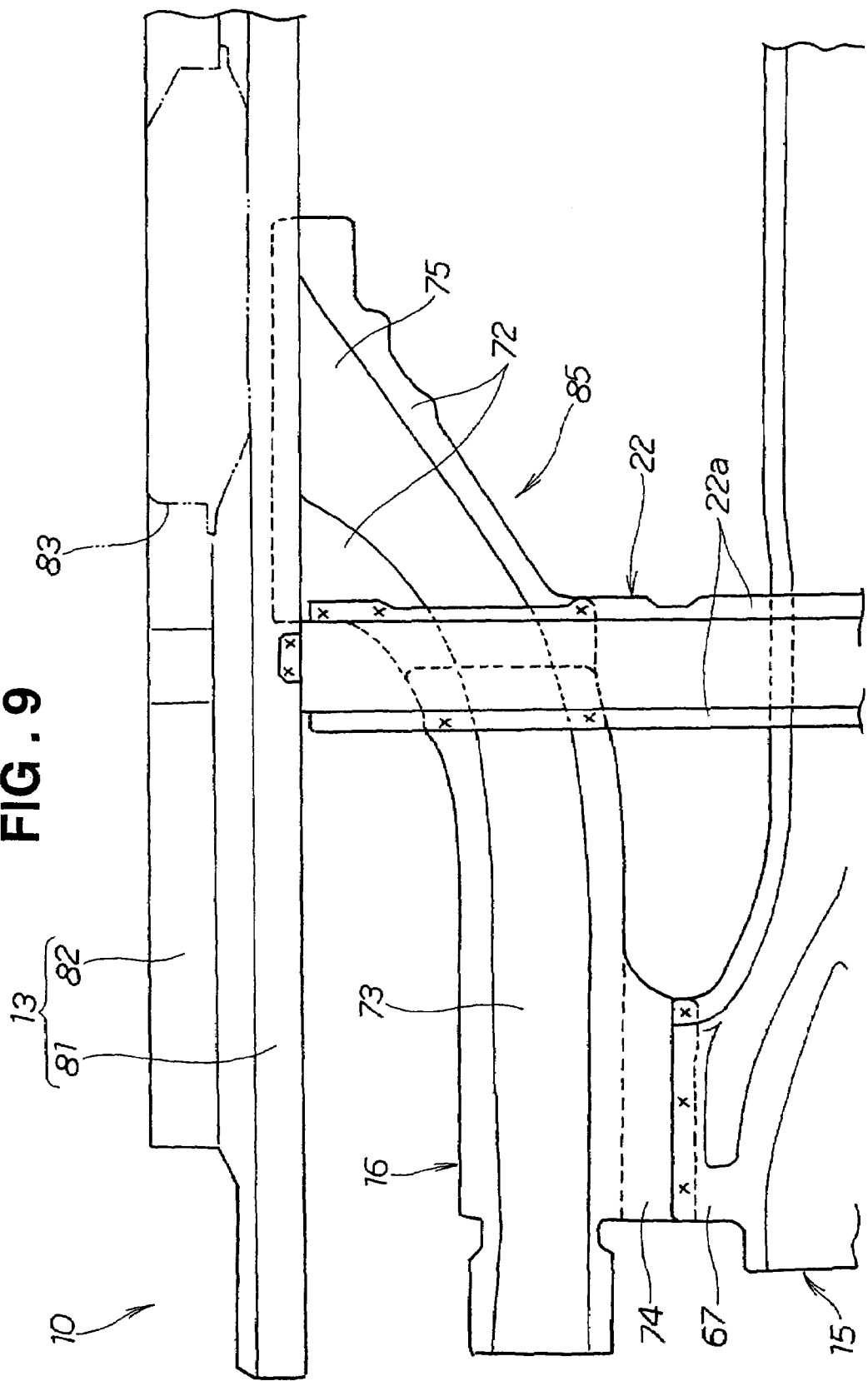
FIG. 9 is a plan view illustrating the connection between a right side sill and the right floor frame member.
Figure 10:
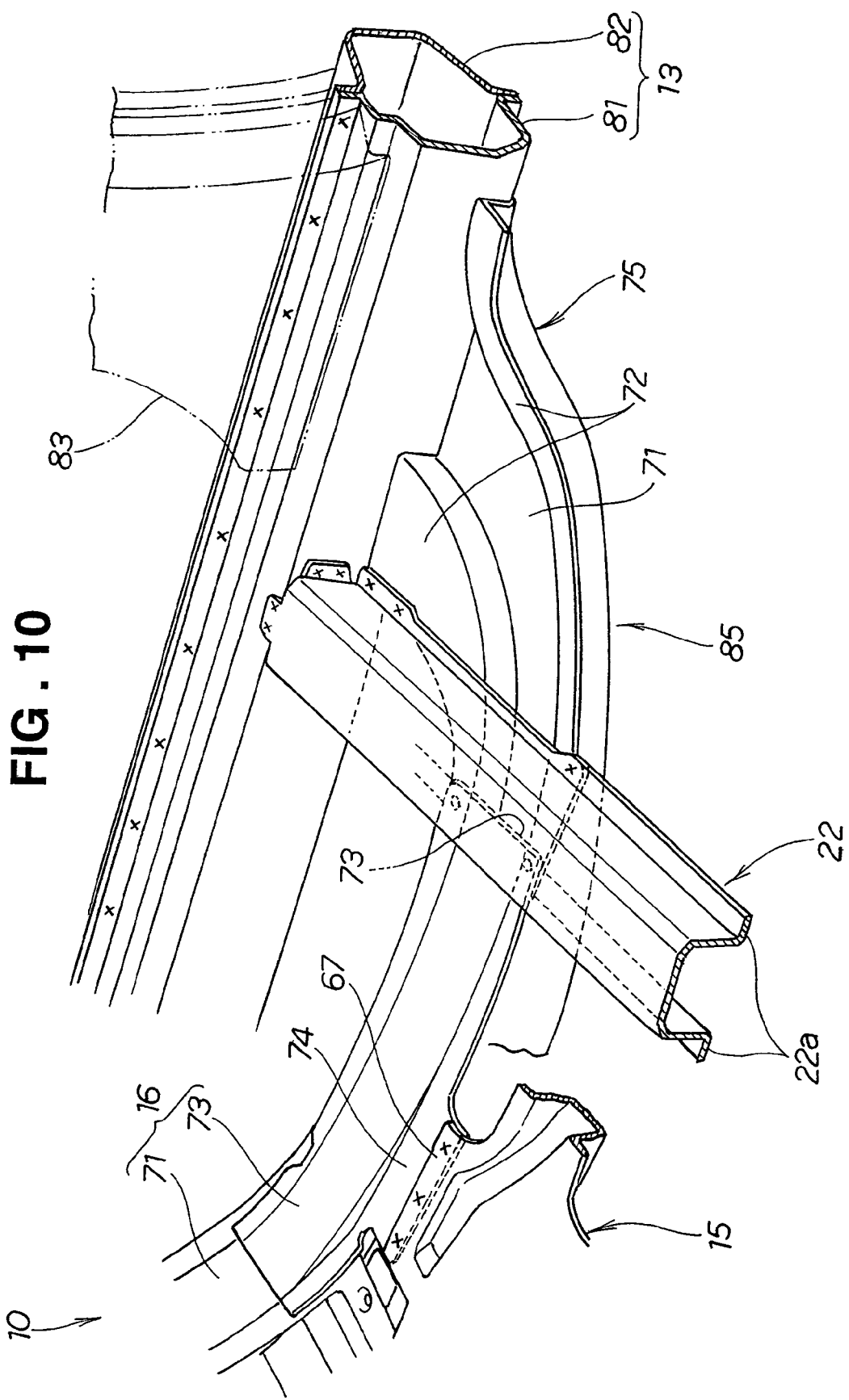
FIG. 10 is a perspective view illustrating the connection between the right side sill and the right floor frame member.

Now, the joint structure of rear end portions 75, 75 of the right and left floor frame members 16, 16 will be described with reference to FIGS. 8 to 10. FIG. 8 is a cross-sectional view taken along line 8—8 in FIG. 1, but shows the floor panel 51 in a mounted state. FIG. 9 illustrates the connection between the right side sill 13 and the right floor frame member 16 without showing the floor panel 51. FIG. 10 illustrates the connection between the right side sill 13 and the right floor frame member 16 without showing the floor panel 51.

As shown in FIG. 8, the side sill 13 is a closed-section beam of a combination of a side sill inner 81 located laterally inside and a side sill outer 82 located laterally outside. A center pillar 83 extends upward from the side sill 13.

As shown in FIGS. 1 and 9, the rear end portions 75, 75 of the right and left floor frame members 16, 16 are joined to longitudinally middle inner portions of the right and left side sills 13, 13. The second crossmember 22 is extended between the right and left side sills 13, 13 in front of the joints and in the vicinity of the joints. The rear end portions 75, 75 of the right and left floor frame members 16, 16 are also joined to the second crossmember 22.

With this arrangement, the joint between the left side sill 13, the left floor frame member 16 and the second cross member 22 can constitute a joint structure of a substantially triangular shape in a plan view, or a triangular joint 85. The joint between the right side sill 13, the right floor frame member 16 and the second crossmember 22 constitutes a joint structure of a substantially triangular shape in a plan view, or a triangular joint 85. The formation of the right and left triangular joints 85, 85 allows the side sills 13, 13, the floor frame members 16, 16 and the second crossmember 22 to complement one another in rigidity.

Thus, the strength and rigidity of the vehicle body 10 can be sufficiently provided without extending the floor frame members 16, 16 to the rear of the vehicle body 10.

When collision energy acts on the front of the front side members 11, the collision energy is transmitted from the front side members 11 to the floor frame members 16. The transmitted collision energy is efficiently dispersed through the rear end portions 75 of the floor frame members 16 into the side sills 13 and the second crossmember 22.

Specifically, as shown in FIGS. 8 and 10, the floor frame member 16 extends rearward, being smaller in thickness to come into contact with a bottom surface 13a of the side sill 13 (see FIG. 8), that is, extends rearward in a tapered shape. As shown in FIGS. 9 and 10, the rear end portion 75 of the floor frame member 16 has a widening shape, curving toward the side sill 13, broadening, when viewed from the top.

The second crossmember 22 has a U-shaped section shape opening downward, including flanges 22a, 22a extending substantially horizontally from the opposite bottom edges, to be placed on and joined to the floor frame members 16 and the center frame members 31.

The floor frame members 16 and the second cross member 22 are fastened together by placing the flanges 22a, 22a of the second crossmember 22 on the floor frame members 16 and joining them by spot welding.

The side sills 13 and the second crossmember 22 are fastened together by joining the ends of the second crossmember 22 to the side sills 13 by spot welding.

Figure 12:
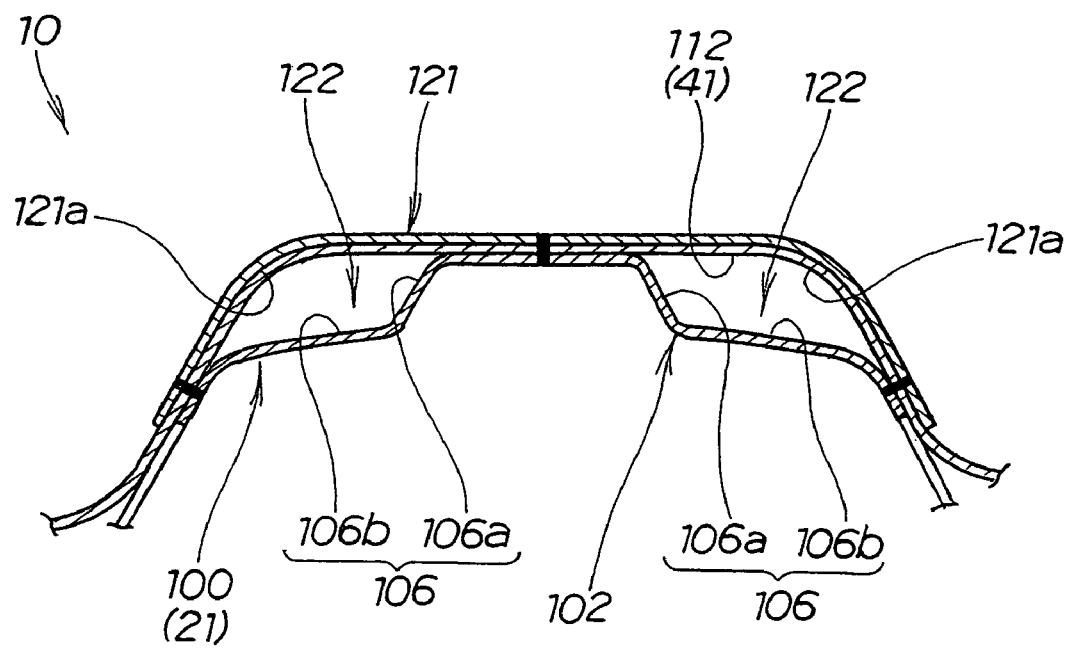
FIG. 12 is a cross-sectional view taken along line 12—12 in FIG. 11.
Figure 13:
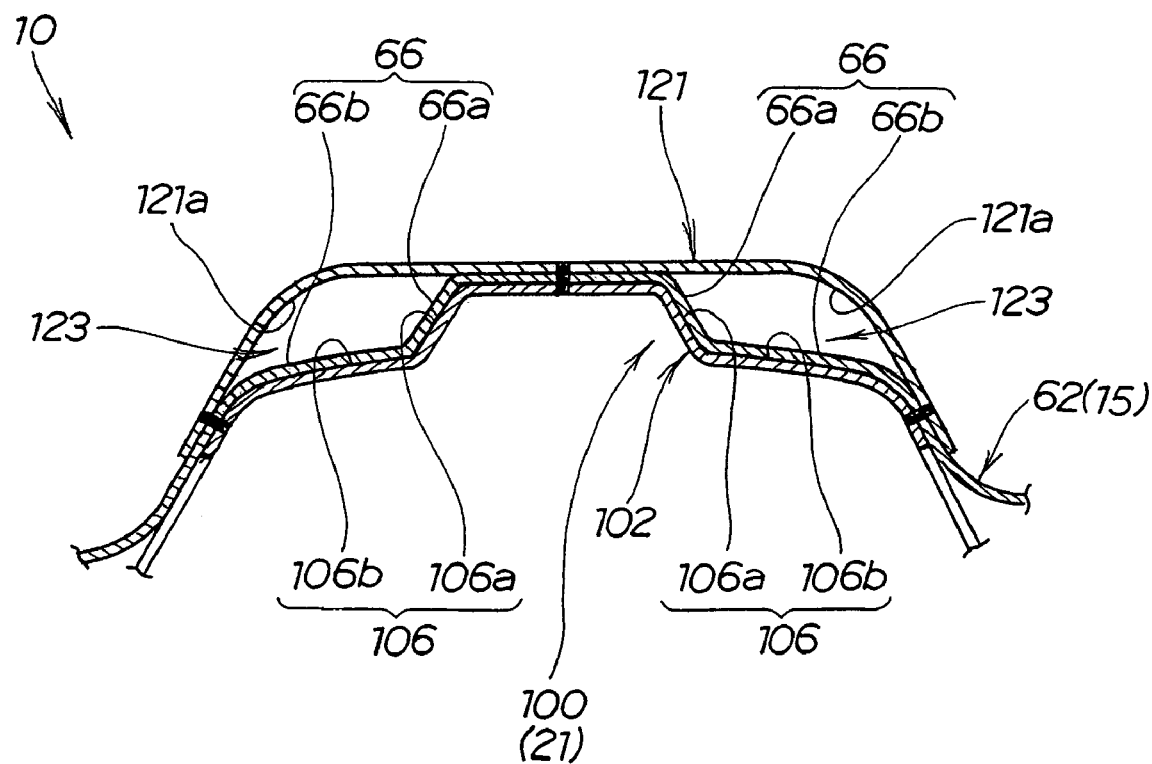
FIG. 13 is a cross-sectional view taken along line 13—13 in FIG. 11.

Now, a joint structure between the floor tunnel 15, the first crossmember 21 and the dashboard 41 will be described with reference to FIGS. 1 to 15. FIG. 1 illustrates the joint structure between the floor tunnel 15, the first crossmember 21 and the dashboard 41. FIG. 12 illustrates a cross section taken along line 12—12 in FIG. 11. FIG. 13 illustrates a cross section taken along line 13—13 in FIG. 11. FIG. 14 illustrates an exploded view of the floor tunnel 15, the first crossmember 21 and the dashboard 41. FIG. 15 illustrates an exploded view of the floor tunnel 15 and the first crossmember 21.

Figure 11:
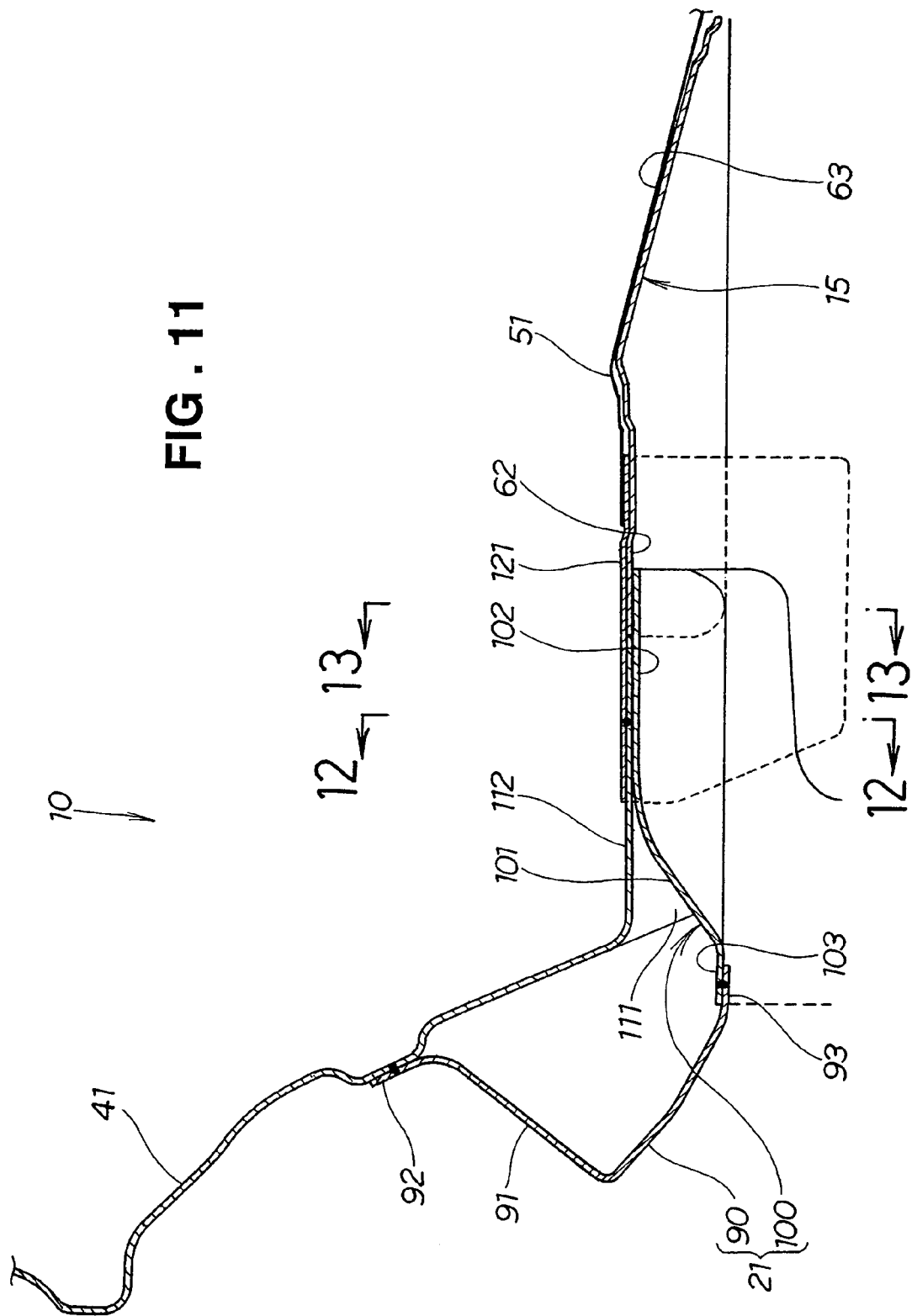
FIG. 11 is a cross-sectional view illustrating the joints between the floor tunnel, a first crossmember and the dashboard.

As shown in FIGS. 11 and 14, the first crossmember 21 consists of a front member half 90 and a rear member half 100. The front member half 90 and the rear member half 100 are bent parts of transversely elongated plate members.

The front member half 90 includes a body 91 of a substantially L-shape protruding forward in a cross-sectional view (see FIG. 11), an upper flange 92 extending upward from the upper edge of the body 91 of the L-shaped section body, a horizontal lower flange 93 extending rearward from the lower edge of the body 91, and right and left side flanges 94, 94 (see FIG. 14) extending laterally from the opposite ends of the body 91.

The rear member half 100 includes a body 101 of a downward U-shaped section body in a rear view, an extension 102 extending rearward from the rear edge of the body 101, a front flange 103 extending forward from the front lower edge of the body 101, and right and left side flanges 104, 104 (see FIG. 14) extending laterally from the opposite ends of the body 101. The extension 102 has a downward U-shaped section in a rear view, like the body 101.

The dashboard 41 is a plate member integrally formed with a lower flange 111 extending rearward from the lower edge and a tunnel portion 112 which can be fitted onto the body 101 and the extension 102 of the rear member half 100 at a width center portion of the lower flange 111. The tunnel portion 112 has a downward U-shaped section in a rear view.

The upper flange 92 of the front member half 90 is placed on and joined to a front lower surface of the dashboard 41. The front flange 103 of the rear member half 100 is placed on and joined to the lower flange 93 of the front member half 90. The tunnel portion 112 of the dashboard 41 is placed on and joined to the body 101 of the rear member half 100. In this manner, the first crossmember 21 is fastened to a front lower portion of the dashboard 41.

The first crossmember 21 can be combined with the dashboard 41 to form a closed-section body extending transversely. The first crossmember 21 of the closed-section body thus has greater strength and rigidity. The dashboard 41 is effectively utilized as a part of the closed-section body, resulting in a reduced weight.

As shown in FIGS. 3, 4 and 14, the right and left side flanges 104, 104 of the rear member half 100 of the first crossmember 21 are overlapped with and joined to the right and left brackets 52, 52 provided at the front side members 11, 11, thereby to extend the first crossmember 21 between the right and left front side members 11, 11.

As shown in FIGS. 11 to 14, the extension 102 and the front end portion 62 of the floor tunnel 15 are downward U-shaped section bodies when viewed from the rear, which U-shaped section bodies are sized to be able to be vertically fitted to one another.

The body 101 and the extension 102 of the rear member half 100, or the downward U-shaped section body includes right and left steps 106, 106 formed by depressing in a step right and left upper corners 105, 105 which are shown in chain double-dashed lines in FIG. 15. Each step 106 includes a bent-down portion 106a extending downward from the top surface and a step surface portion 106b extending laterally from the bottom of the bent-down portion 106a.

The front end portion 62 of the floor tunnel 15, the first crossmember 21 and the dashboard 41 constitute a structure in which: (1) the front end portion 62 of the floor tunnel 15 is placed on a rear half portion of the extension 102; (2) the tunnel portion 112 of the dashboard 41 is placed on the body 101 and a front half portion of the extension 102 of the rear member half 100; (3) the rear end of the tunnel portion 112 of the dashboard 41 is abutted on the front end of the floor tunnel 15 shown in FIG. 11; (4) a single reinforcing member 121 of a downward U-shape in a rear view is placed on the front end portion 62 of the floor tunnel 15 and on the tunnel portion 112; and (5) the members 62, 102, 111, 112 and 121 are joined by spot welding. In this manner, the front end portion 62 of the floor tunnel 15 is joined to the rear end portion of the extension 102.

The reinforcing member 121 is a bent part of a plate member, and, as described above, is a wear plate placed on the front end portion 62 of the floor tunnel 15 and on the tunnel portion 112 of the dashboard 41. The plate thickness of the reinforcing member 112 is approximately the same as that of the floor tunnel 15, the first crossmember 21 and the dashboard 41.

As shown in FIG. 1, collision energy acting from the front of the vehicle body 10 is transmitted through the right and left front side members 11, 11 to the first crossmember 21, and is further efficiently transmitted through the extension 102 (see FIG. 14) of the first crossmember 21 to the front end portion 62 of the floor tunnel 15. Consequently, the collision energy can be efficiently and sufficiently dispersed throughout the vehicle body 10. As a result, the entire vehicle body 10 can sufficiently absorb the collision energy, resulting in improved performance of the vehicle body 10 in collision energy absorption.

When the vehicle is running, vibrations from the front wheels 35, 35 shown in FIG. 1 and vibrations from the engine 45, or running vibrations are generally transmitted from the subframe 44 to the first crossmember 21 through the front side members 11, 11 and the brackets 52, 52.

The preset invention allows the vibrations to be not only absorbed by the first crossmember 21 but also transmitted to the floor tunnel 15 via the extension 102 and absorbed by that portion. Thus, the vehicle body 10 has improved vibration absorption performance.

As shown in FIGS. 11 to 13 and FIG. 15, on the first crossmember 21, the single reinforcing member 121 is placed on the extension 102, the front end portion 62 and the tunnel portion 112 and joined together. Consequently, the right and left steps 106, 106 (see FIG. 15) of the extension 102 and right and left sidewalls 121a, 121a of the reinforcing member 121 form closed-section portions 122, 122 (see FIG. 12) extending longitudinally. Also, the right and left steps 66, 66 (see FIG. 15) of the floor tunnel 15 and the right and left sidewalls 121a, 121a of the reinforcing member 121 form closed-section portions 123, 123 (see FIG. 13) extending longitudinally. The right closed-section portions 122, 123 and the left closed-section portions 122, 123 are continuous with one another.

In this manner, the longitudinally extending closed-section portions 122, 122 are formed along the right and left upper corners 105, 105 (see FIG. 15) of the extension 102, and also the longitudinally extending closed-section portions 123, 123 are formed along the right and left upper corners 65, 65 (see FIG. 15) of the floor tunnel 15. The right closed-section portions 122, 123 and the left closed-section portions 122, 123 are continuous with one another, increasing the rigidity of the joined portion of the floor tunnel 15 to the extension 102.

Collision energy acting from the front of the vehicle body 10 is thus efficiently transmitted through the extension 102 of the first crossmember 21 to the front end portion 62 of the floor tunnel 15. The vehicle body 10 thus has improved performance in collision energy absorption.

Since the rigidity of the joined portion of the floor tunnel 15 to the extension 102 is increased, the high-rigidity portion and the floor tunnel 15 also absorb vibration caused by vehicle running, and also increase the entire rigidity of the vehicle body 10, improving the drivability of the vehicle.

Figure 16A:
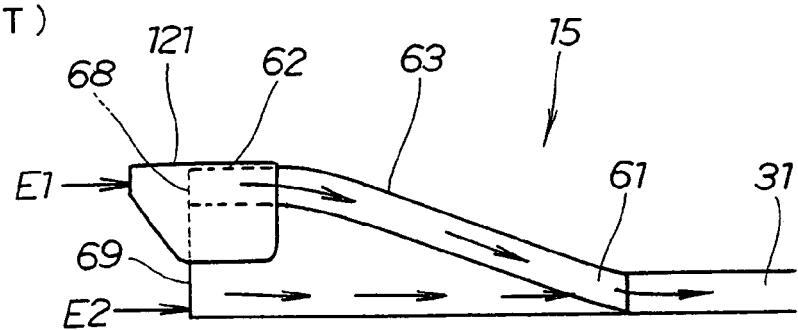
FIGS. 16A, 16B and 16C are diagrams illustrating an embodiment of the present invention and a comparative example when collision energy acts on a floor tunnel.
Figure 16B:
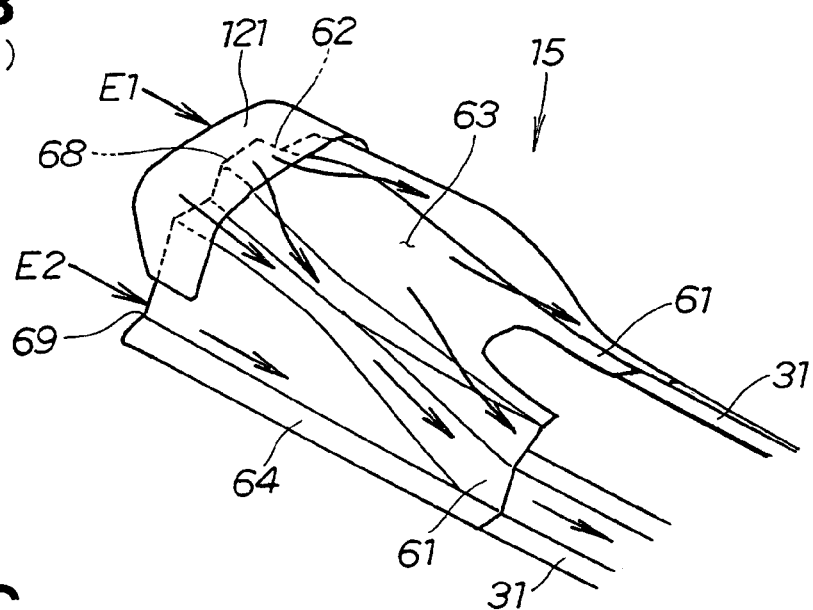

Now, the action of collision energy on the floor tunnel 15 of the above configuration will be described with reference to FIGS. 16A to 16C. FIGS. 16A and 16B illustrate the floor tunnel 15 in this embodiment, and FIG. 16C illustrates a floor tunnel 15A as a comparative example.

Figure 16C:
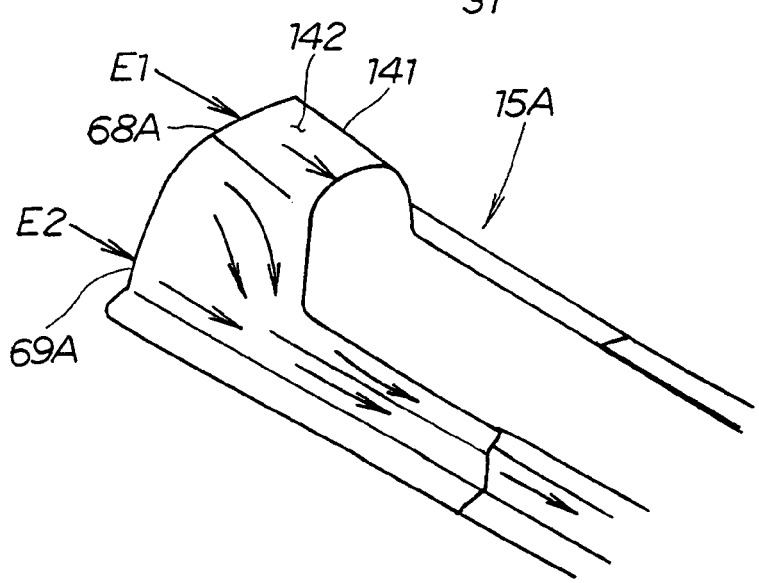

The floor tunnel 15A in the comparative example shown in FIG. 16C has a tunnel portion 141 only at its front half portion, and the rear end of the tunnel portion 141 is formed almost vertically. A top wall 142 of the tunnel portion 141 is substantially horizontal.

When collision energy acts on the front of the vehicle body 10 shown in FIG. 1, plastically deforming the front of the vehicle body 10, the subframe 44 mounted to the front of the vehicle body 10 and the engine 45 mounted on the subframe 44 are moved rearward. As a result, the retreated engine 45 in a high level strikes a front upper edge 68A of the floor tunnel 15A shown in FIG. 16C, and collision energy E1 acts on the front upper edge 68A. Also, from the retreated subframe 44 in a low level (see FIG. 1), collision energy E2 acts on a front lower edge 69A of the floor tunnel 15A.

In this manner, the collision energy E1, E2 is transmitted from both the retreated high-level engine 45 and low-level subframe 44 to the floor tunnel 15A. In order to efficiently transmit the collision energy E1 acting on the front upper edge 68A to the rear of the floor tunnel 15A at that time, it has room for improvement.

In the present embodiment shown in FIGS. 16A and 16B, the top wall 63 of the floor tunnel 15 is sloped rearward and downward from the front end portion 62. Therefore, when collision energy E1 acts on a front upper edge 68 of the floor tunnel 15, the collision energy E1 is efficiently transmitted rearward and downward of the floor tunnel 15 along the downslope, and is further efficiently transmitted through the rearward second and third crossmembers 22, 23 (see FIG. 1) to the vehicle rear.

When collision energy E2 acts on a front lower edge 69 of the floor tunnel 15, the collision energy E2 is directly and efficiently transmitted to the rear of the floor tunnel 15, and is further efficiently transmitted through the rearward second and third crossmembers 22, 23 (see FIG. 1) to the vehicle rear.

There is no need to provide a member for efficiently transmitting the collision energy E1, E2 from the floor tunnel 15 to the vehicle rear, and thus the vehicle weight can be reduced.

In addition, a rear half portion of the floor tunnel 15 can be reduced in height to make the passenger compartment larger, improving the comfort of the passenger compartment.

Figure 17A:
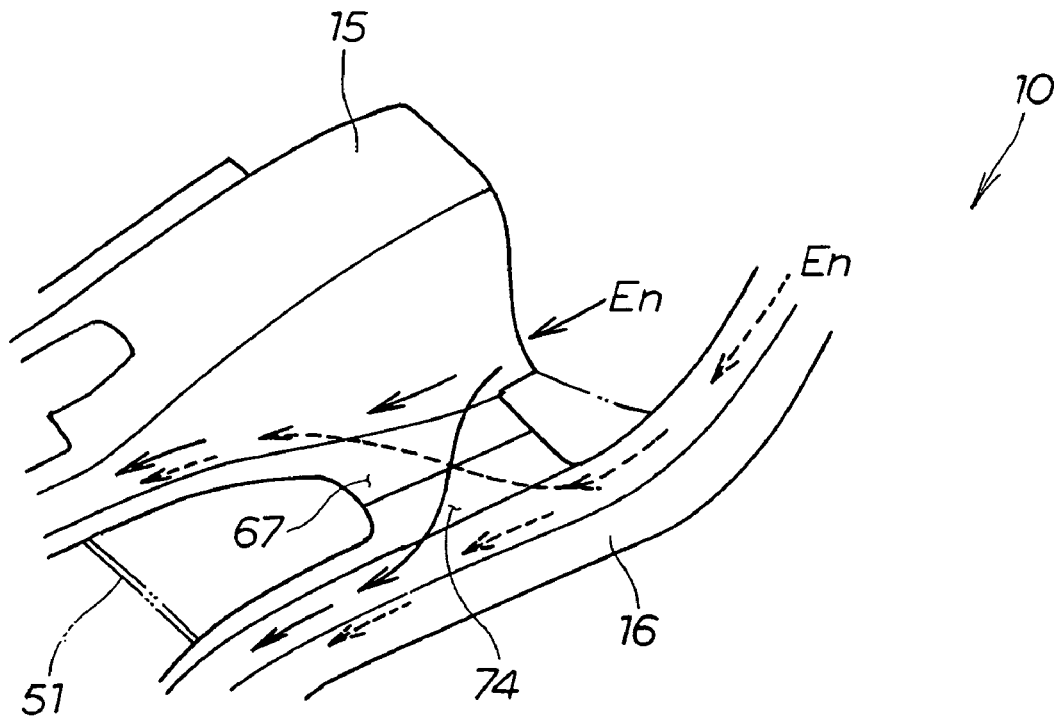
FIGS. 17A and 17B are diagrams illustrating the embodiment and a comparative example when collision energy acts on a floor tunnel and a floor frame member.
Figure 17B:
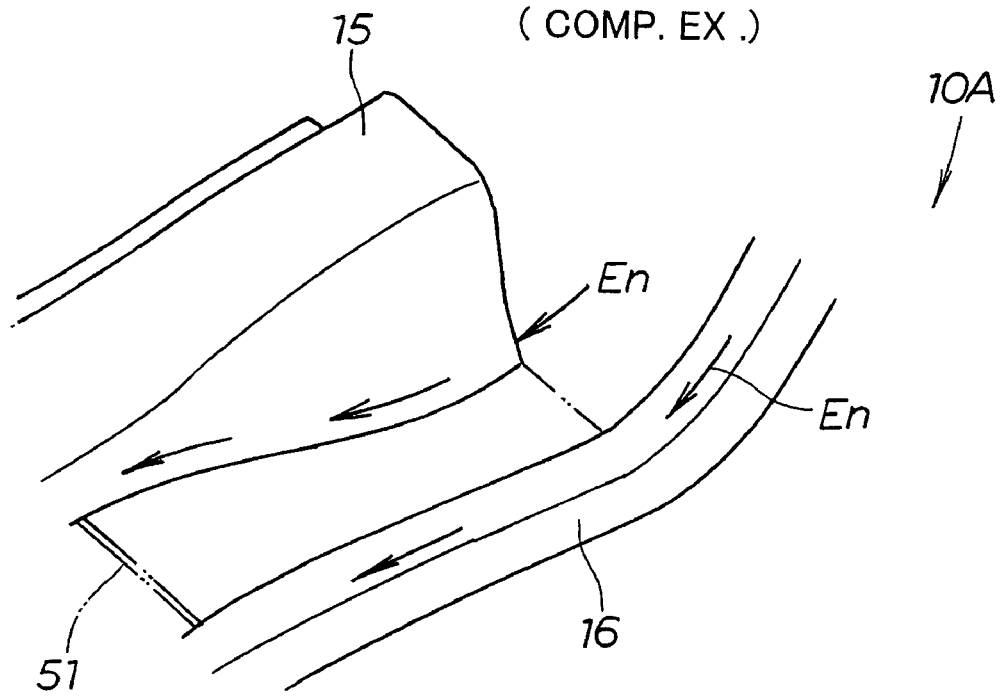

Now, the action of collision energy on the joined floor tunnel 15 and floor frame member 16 will be described with reference to FIGS. 17A and 17B. FIG. 17A illustrates the joined floor tunnel 15 and floor frame member 16 in this embodiment. FIG. 17B illustrates a floor tunnel 15 and a floor frame member 16 in a comparative example.

A vehicle body 10A in the comparative example shown in FIG. 17B has a structure in which the floor frame member 16 is separated from the floor tunnel 15 and a floor panel 51 continuous with the floor tunnel 15 is placed on and joined to right and left floor frame members 16.

When collision energy En acts from the front of the vehicle body 10A, the collision energy En is transmitted and dispersed through the floor frame member 16 to the floor panel 51, and is also transmitted and dispersed from the floor tunnel 15 to the floor panel 51. With this structure, it is difficult to set the amount of retreat and the amount of plastic deformation of the floor frame member 16 equal to the amount of plastic deformation of the floor tunnel 15. The floor panel 51 can thus be deformed between the floor tunnel 15 and the floor frame member 16.

In the present embodiment shown in FIG. 17A, since the front side portion of the floor frame member 16 is directly joined to the front side portion of the floor tunnel 15 via the tunnel side extension 67 and the frame side extension 74, the floor tunnel 15 and the floor frame member 16 can disperse a longitudinal load therebetween into one another. Also, the floor tunnel 15 and the floor frame member 16 can complement one another in strength and rigidity.

When collision energy En acts from the front of the vehicle body 10, the collision energy En acting on the floor tunnel 15 is directly transmitted and dispersed from the floor tunnel 15 to the floor frame member 16. Also, the collision energy En acting on the floor frame member 16 is directly transmitted and dispersed from the floor frame member 16 to the floor tunnel 15. Longitudinal displacement between the floor tunnel 15 and the floor frame member 16 can thus be prevented, resulting in prevention of deformation of the floor panel 51 between the floor tunnel 15 and the floor frame member 16. The prevention of deformation of the floor panel 51 ensures the joined state of the floor panel 51 to the floor tunnel 15 and the floor frame member 16.

This simple structure of only directly joining the front side portion of the floor tunnel 15 to the front side portion of the floor frame member 16 eliminates the need for providing an additional joining member. Thus, the vehicle body 10 is configured simply and the weight of the vehicle body 10 can be reduced.

Figure 18A:
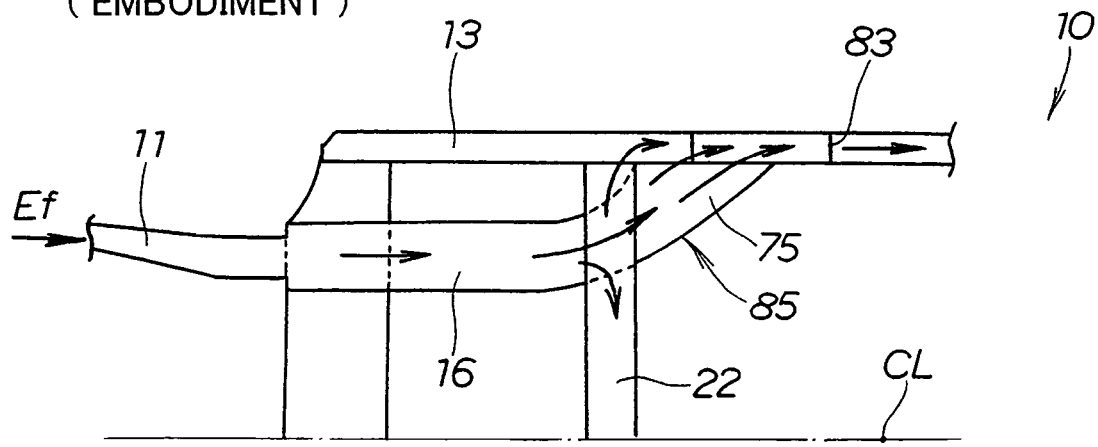
FIGS. 18A, 18B and 18C are diagrams illustrating the embodiment and a comparative example when collision energy acts from the front of a vehicle body on the vehicle body.
Figure 18B:
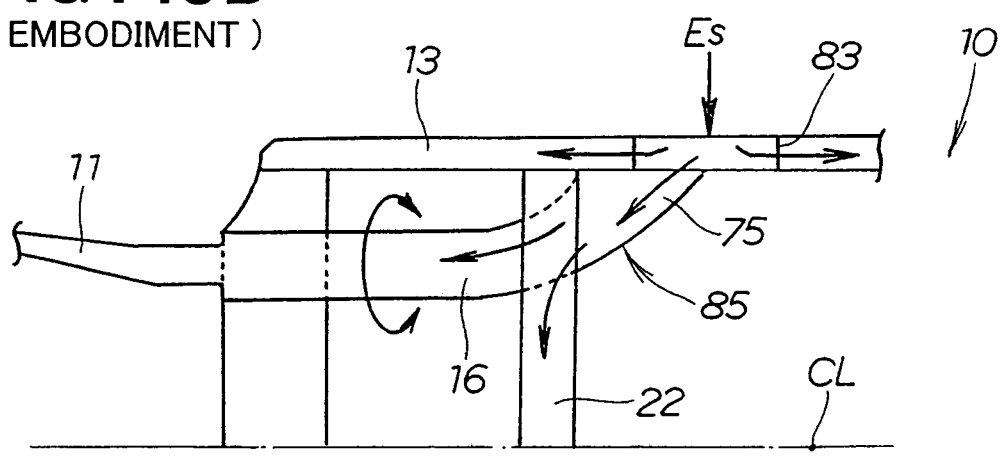
Figure 18C:
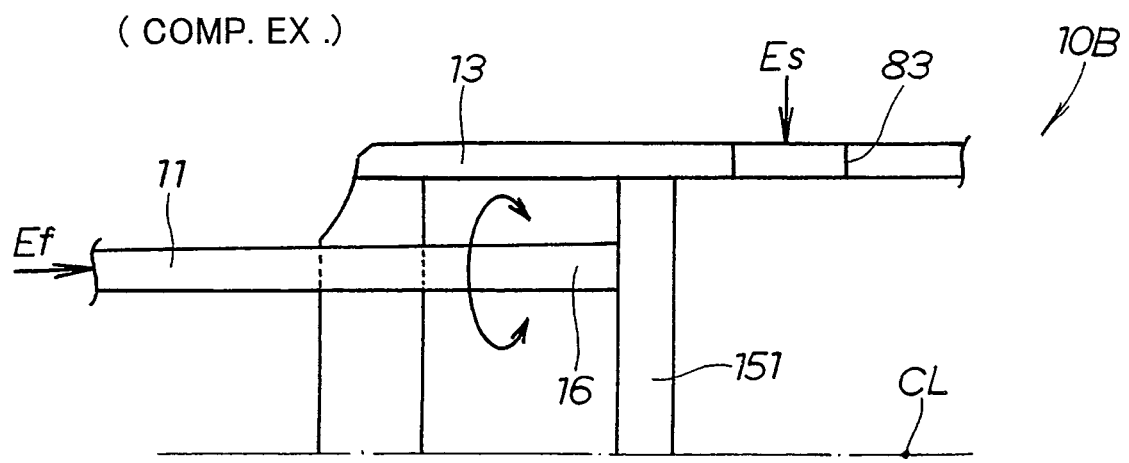
Figure 19:
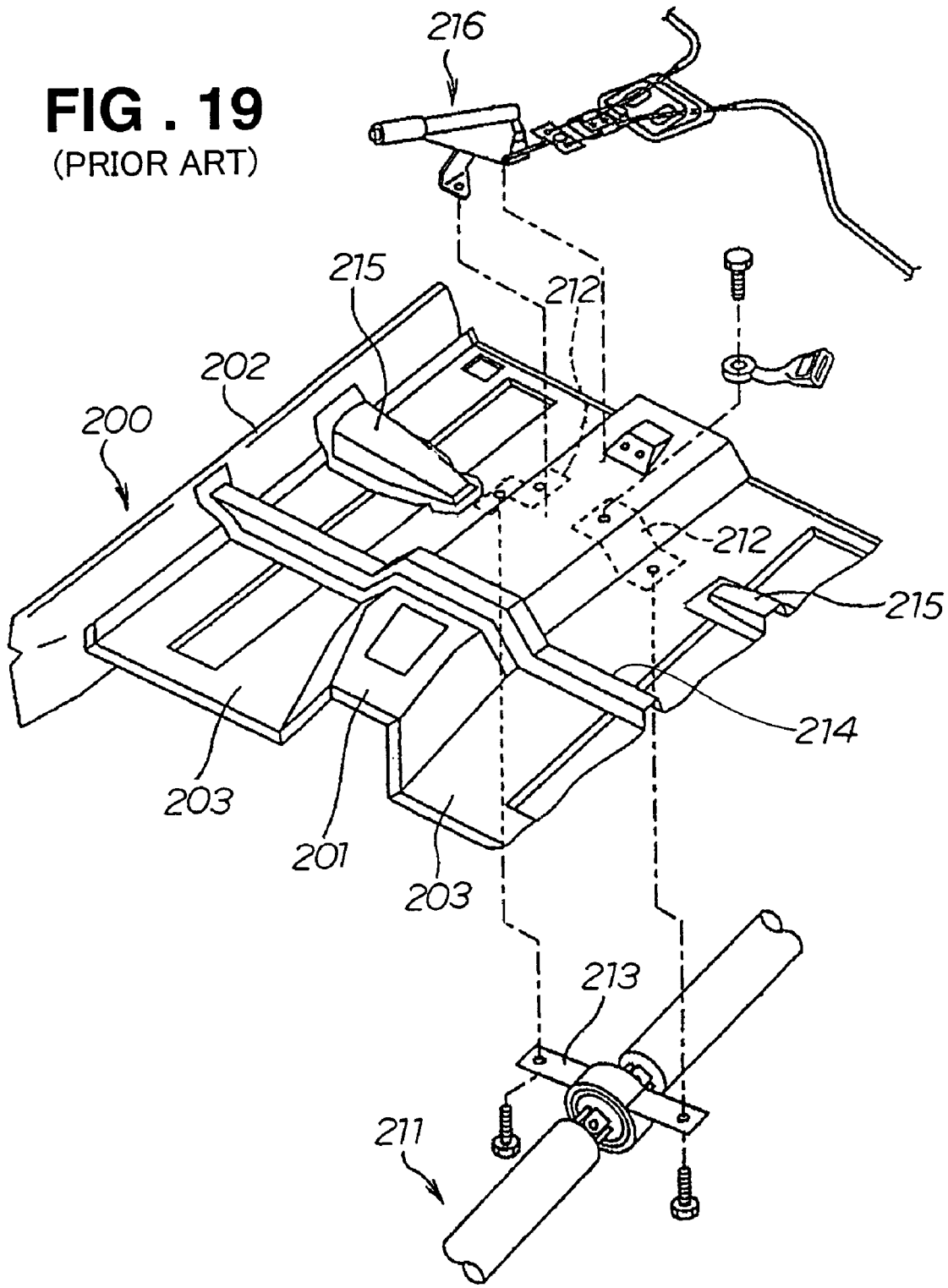
FIG. 19 is a schematic diagram of a conventional vehicle body structure provided with a floor tunnel.
Figure 20:
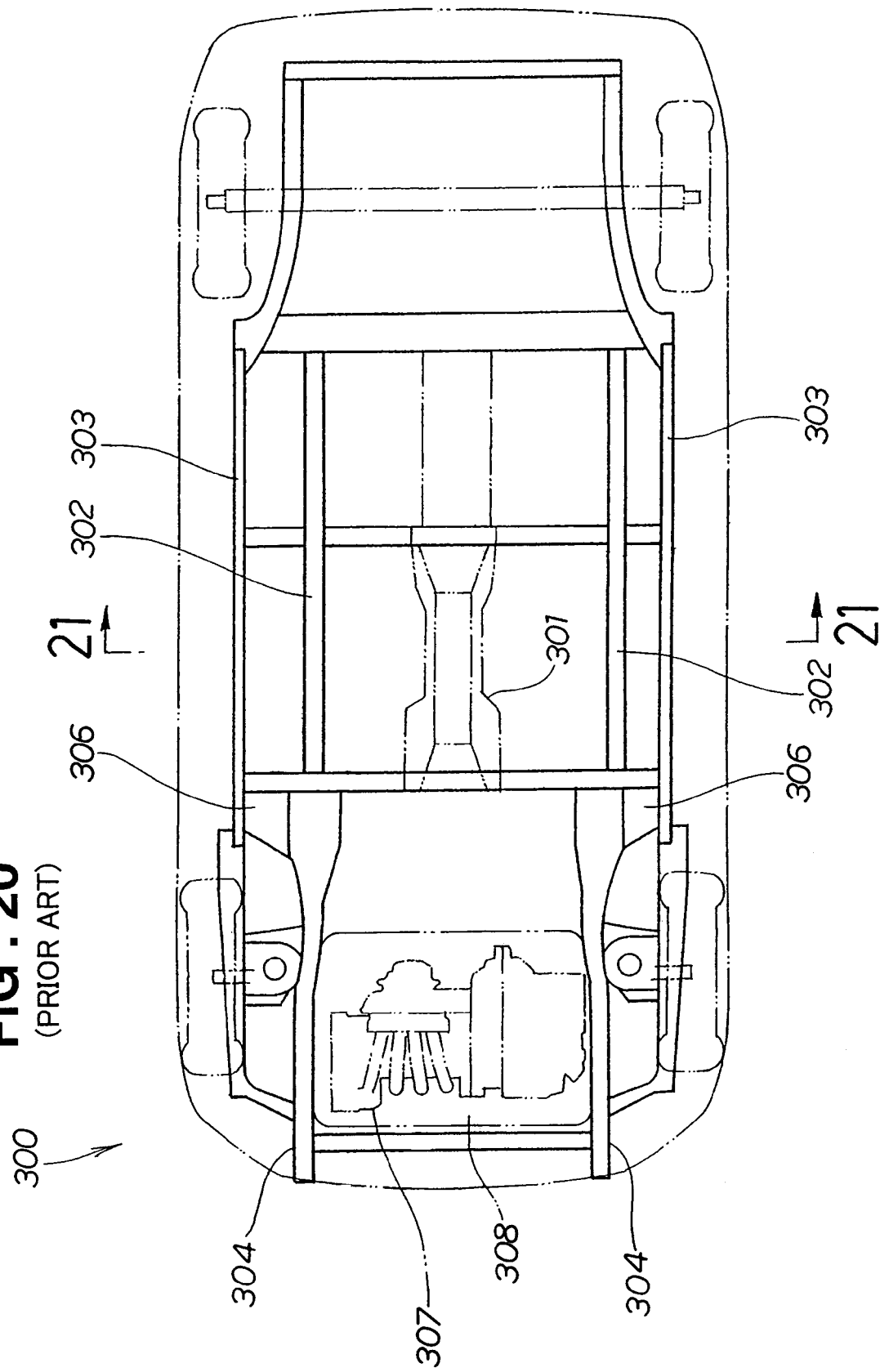
FIG. 20 is a top plan view of another conventional vehicle body structure.
Figure 21:
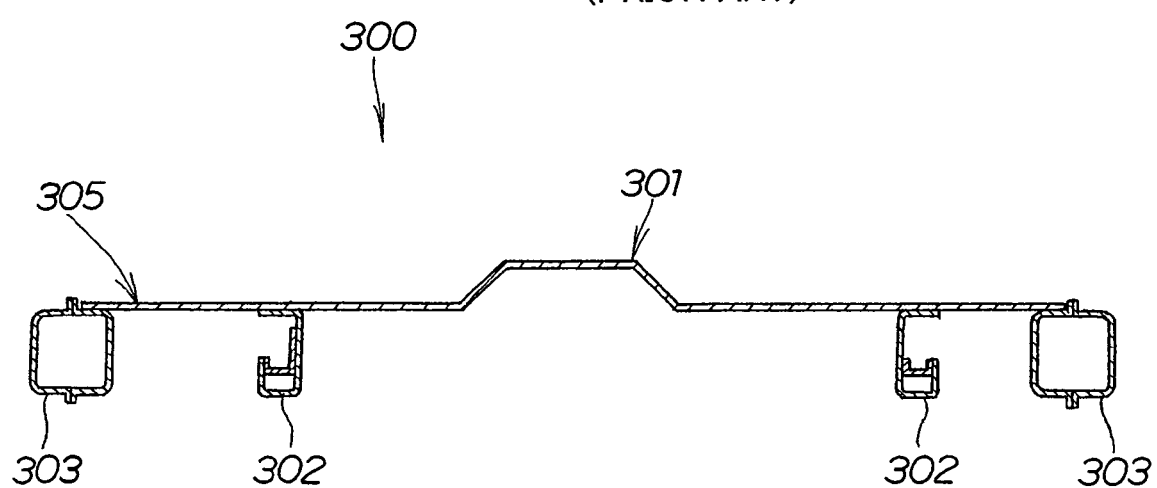
FIG. 21 is a cross-sectional view taken along line 21—21 in FIG. 20.

Now, the function of the triangular joints 85 formed by the side sills 13, the floor frame members 16 and the second crossmember 22 will be described with reference to FIGS. 18A to 18C. FIG. 18A illustrates collision energy Ef acting from the vehicle front on the vehicle body 10 in this embodiment. FIG. 18B illustrates collision energy Es acting from the vehicle side on the vehicle body 10 in this embodiment. FIG. 18C illustrates front collision energy Ef and side collision energy Es acting on a vehicle body 10B in a comparative example.

The vehicle body 10B in the comparative example shown in FIG. 18C has a structure in which: right and left floor frame members 16 (Only one is shown. Hereinafter the same.) closer to the longitudinal center line CL and right and left side sills 13 laterally outside of the floor frame members 16 are provided in parallel; a crossmember 151 is extended between the right and left side sills 13; the rear ends of the floor frame members 16 are joined to the crossmember 151; and front side members 11 are extended forward from the front ends of the floor frame members 16.

Collision energy Ef acting from the front of the vehicle body 10B is transmitted from the front side member 11 through the floor frame member 16 to the crossmember 151. However, there is room for improvement in efficiently dispersing the collision energy Ef from the crossmember 151 into the orthogonal side sill 13.

The impact energy Es acting from the side of the vehicle body 10B is transmitted from the side sill 13 to the crossmember 151. However, there is room for improvement in efficiently dispersing the collision energy Es from the crossmember 15 into the orthogonal floor frame member 16.

In the present embodiment shown in FIGS. 18A and 18B, the joint between the side sill 13, the floor frame member 16 and the second crossmember 22 has a substantially triangular joint structure in a plan view, or the triangular joint 85.

The triangular joint 85 allows the side sill 13, the floor frame member 16 and the second crossmember 22 to complement one another in strength and rigidity.

As shown in FIG. 18A, collision energy Ef acting from the front of the vehicle body 10 is transmitted from the front side member 11 through the floor frame member 16 to the triangular joint 85, and is further efficiently dispersed from the triangular joint 85 to the second crossmember 22 and the side sill 13.

As shown in FIG. 18B, collision energy Es acting from the side of the vehicle body 10 is transmitted from the side sill 13 to the triangular joint 85, and is further efficiently dispersed from the triangular joint 85 to the floor frame member 16 and the second crossmember 22.

In this manner, both of the collision energy Ef acting from the front of the vehicle body 10 and the collision energy Es acting from the side of the vehicle body 10 are efficiently and sufficiently dispersed throughout the vehicle body 10. As a result, the collision energy Ef, Es is sufficiently absorbed by the entire vehicle body 10, resulting in improved performance of the vehicle body 10 in absorbing the collision energy Ef, Es. There is no need to make the components of the vehicle body 10 larger and to provide additional reinforcing members for reinforcing the components. Thus, the weight of the vehicle body 10 can be reduced, and sufficient space can be provided in the passenger compartment.

During vehicle running, vibration from the front wheels is generally transmitted via the front of the vehicle body 10 to the floor frame members 16. The vibration generally occurs in the direction of twisting the floor frame members 16 as shown by arrows in FIG. 18B.

In this embodiment, the second crossmember 22 is provided in a position forward of the joints between the side sills 13 and the rear end portions 75 of the floor frame members 16, and the floor frame members 16 are also joined to the second crossmember 22, so that the length of the floor frame members 16 can be shortened accordingly. Since rear portions of the floor frame members 16 each form part of the strong triangular joint 85, the twisting vibration of the floor frame members 16 can be reduced.

Obviously, various minor changes and modifications of the present invention are possible in the light of the above teaching. It is therefore to be understood that within the scope of the appended claims the invention may be practiced otherwise than as specifically described.

What is claimed is:

1. A vehicle body structure, comprising:
    a floor tunnel provided in a center of a width of a vehicle body and extending longitudinally of the vehicle body, wherein said floor tunnel has a substantially downward U-shaped cross section and includes right and left steps formed at right and left upper corners of the floor tunnel, and said floor tunnel further includes a front end portion;
    right and left floor frame members provided right and left of the floor tunnel, respectively;
    right and left center frame members disposed on right and left sides of the center of the vehicle body, respectively, and extending rearwardly from the floor tunnel, wherein the floor tunnel includes right and left side portions, and wherein at least one of the right and left side portions of the floor tunnel is joined to at least one of the right and left floor frame members, and a rear portion of the floor tunnel is joined to the right and left center frame members;
    a first crossmember disposed forwardly of the floor tunnel and extending between the right and left floor frame members, the first crossmember having a rear extension with a downwardly U-shaped cross section extending toward the floor tunnel, the downwardly U-shaped rear extension including right and left steps formed at right and left upper corners thereof;
    a dashboard having a tunnel portion with a downwardly U-shaped cross section fitted onto the downwardly U-shaped rear extension of the first crossmember, the tunnel portion having a rear end in abutment with a front end of the front end portion of the floor tunnel;
    a single reinforcing member with a downwardly U-shaped cross section, said single reinforcing member being placed on the front end portion of the floor tunnel and on the tunnel portion of the dashboard; and
    the front end portion of the floor tunnel, the rear extension of the first crossmember, the tunnel portion of the dashboard, and the single reinforcing member are joined together so that the right and left steps of the rear extension and the downwardly U-shaped reinforcing member cooperate to form first right and left closed-section portions extending longitudinally of the vehicle body and so that the right and left steps of the floor tunnel and the downwardly U-shaped reinforcing member cooperate to form second right and left closed-section portions extending longitudinally of the vehicle body, and wherein each of the first right and left closed-section portions and a corresponding one of the second right and left closed-section portions are continuous with one another.

2. The vehicle body structure according to claim 1, wherein a front portion of at least one of the right and left side portions of the floor tunnel is directly connected to a front side portion of at least one of the right and left floor frame members.

3. The vehicle body structure according to claim 2, further comprising right and left side sills disposed outside of the right and left floor frame members, respectively, and extending longitudinally of the vehicle body, and a second crossmember disposed rearward of the floor tunnel and extending between the right and left side sills, wherein the right and left floor frame members have rear end portions joined to longitudinally middle inner portions of the right and left side sills, respectively, the second crossmember is connected to the right and left side sills at joints disposed in front of and in the vicinity of joints formed between the right and left floor frame members and the right and left side sills, and the rear end portions of the right and left floor frame members are also joined to the second crossmember, and wherein each of the right and left side sills, a corresponding one of the right and left floor frame members and the second crossmember together form a joint structure of a substantially triangular shape in a plan view.

4. The vehicle body structure according to claim 1, wherein said right and left floor frame members are beams of a closed-section structure.

5. The vehicle body structure according to claim 4, further comprising a second crossmember that extends between right and left side sills, wherein said right and left side sills are provided outside of the right and left floor frame members, respectively, and extend longitudinally of the vehicle body, wherein a top surface of the floor tunnel is sloped rearward and downward from a front end portion thereof, and the rear end portion of the floor tunnel is joined to the second crossmember.

6. The vehicle body structure according to claim 4, wherein a front portion of at least one of the right and left side portions of the floor tunnel is directly connected to a front side portion of at least one of the right and left floor frame members.

7. The vehicle body structure according to claim 6, wherein the front portion of the at least one of the right and left side portions of the floor tunnel includes a substantially horizontal tunnel side extension extending toward the at least one of the right and left floor frame members, the at least one of the right and left floor frame members includes a substantially horizontal frame side extension extending toward the floor tunnel, and the tunnel side extension is overlapped with and joined to the frame side extension.

8. The vehicle body structure according to claim 5, wherein a rear end portion of the left front frame member is attached to the left side sill only at a location disposed rearwardly of the second crossmember and wherein a rear end portion of the right front frame member is attached to the right side sill only at a location disposed rearwardly of the second crossmember.

9. The vehicle body structure according to claim 1, wherein only one of the floor tunnel right and left side portions is joined to one of the left and right floor frame members, and the other of said left and right floor frame members is spaced apart from the floor tunnel so as to define a space between said other of said left and right floor frame members and the floor tunnel.

10. The vehicle body structure according to claim 9, further comprising a second crossmember that extends between right and left side sills, wherein said right and left side sills are provided outside of the right and left floor frame members, respectively, and extend longitudinally of the vehicle body, wherein a top surface of the floor tunnel is sloped rearward and downward from a front end portion thereof, and the rear end portion of the floor tunnel is joined to the second crossmember.

11. The vehicle body structure according to claim 9, wherein a front portion of said one of the right and left side portions of the floor tunnel is directly connected to a front side portion of said one of the right and left floor frame members.

12. The vehicle body structure according to claim 11, wherein the front portion of said one of the right and left side portions of the floor tunnel includes a substantially horizontal tunnel side extension extending toward said one of the right and left floor frame members, and said one of the right and left floor frame members includes a substantially horizontal frame side extension extending toward the floor tunnel, and wherein the tunnel side extension is overlapped with and joined to the frame side extension.

13. The vehicle body structure according to claim 9, wherein said right and left floor frame members are beams of a closed-section structure.

14. The vehicle body structure according to claim 13, further comprising a second crossmember that extends between right and left side sills, wherein said right and left side sills are provided outside of the right and left floor frame members, respectively, and extend longitudinally of the vehicle body, wherein a top surface of the floor tunnel is sloped rearward and downward from a front end portion thereof, and the rear end portion of the floor tunnel is joined to the second crossmember.

15. The vehicle body structure according to claim 13, wherein a front portion of said one of the right and left side portions of the floor tunnel is directly connected to a front side portion of said one of the right and left floor frame members.

16. The vehicle body structure according to claim 15, wherein the front portion of said one of the right and left side portions of the floor tunnel includes a substantially horizontal tunnel side extension extending toward said one of the right and left floor frame members, wherein said one of the right and left floor frame members includes a substantially horizontal frame side extension extending toward the floor tunnel, and wherein the tunnel side extension is overlapped with and joined to the frame side extension.

17. The vehicle body structure according to claim 14, wherein a rear end portion of the left front frame member is attached to the left side sill only at a location disposed rearwardly of the second crossmember and wherein a rear end portion of the right front frame member is attached to the right side sill only at a location disposed rearwardly of the second crossmember.

* * * * *